United States Patent
Cheung et al.

(10) Patent No.: US 11,163,935 B2
(45) Date of Patent: Nov. 2, 2021

(54) INTELLIGENT NAVIGATION VIA A TRANSIENT USER INTERFACE CONTROL

(71) Applicant: Microsoft Technology Licensing, LLC, Redmond, WA (US)

(72) Inventors: Chairy Chiu Ying Cheung, Redmond, WA (US); Raghunath Mallya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/667,433

(22) Filed: Oct. 29, 2019

(65) Prior Publication Data

US 2020/0065360 A1 Feb. 27, 2020

Related U.S. Application Data

(63) Continuation of application No. 15/276,724, filed on Sep. 26, 2016, now Pat. No. 10,496,734.

(51) Int. Cl.
*G06F 3/048* (2013.01)
*G06F 40/137* (2020.01)
*G06F 3/0482* (2013.01)
*G06F 3/0485* (2013.01)
*G06F 9/451* (2018.01)

(52) U.S. Cl.
CPC .......... *G06F 40/137* (2020.01); *G06F 3/0482* (2013.01); *G06F 3/04855* (2013.01); *G06F 9/451* (2018.02)

(58) Field of Classification Search
CPC ...... G06F 40/137; G06F 9/451; G06F 3/0482; G06F 3/04855
See application file for complete search history.

(56) References Cited

U.S. PATENT DOCUMENTS

| | | | | |
|---|---|---|---|---|
| 8,537,180 | B1 * | 9/2013 | Grieve | G09G 5/34 345/660 |
| RE46,309 | E * | 2/2017 | Go | G06F 9/451 |
| 9,652,541 | B1 * | 5/2017 | Amacker | G06F 16/9535 |
| 9,910,835 | B2 * | 3/2018 | Hunt | G06F 3/0482 |
| 2001/0052110 | A1 * | 12/2001 | Orbanes | G06F 16/954 717/100 |
| 2005/0188174 | A1 * | 8/2005 | Guzak | G06F 16/168 711/203 |
| 2006/0123361 | A1 * | 6/2006 | Sorin | G06F 16/954 715/854 |
| 2007/0156651 | A1 * | 7/2007 | Weigel | G06F 16/313 |
| 2009/0063547 | A1 * | 3/2009 | Wright | G06F 16/64 |

(Continued)

*Primary Examiner* — David E Choi

(57) ABSTRACT

Examples provide for intelligent navigation of hierarchical groups of items. A current level of items being viewed by a user is automatically detected in response to a context change. The context change includes, for example, a zoom-in, zoom-out, or scroll associated with an item in the hierarchical group of items. A transient user interface control including a contextual breadcrumb list representing a path from a root node to the current level is automatically generated for presentation to the user. An action including, for example, a search, filter, or sort of items within the detected current group of items is performed based on input received from the user via the presented transient user interface control. A result of the performed action is presented for display.

20 Claims, 14 Drawing Sheets

(56) References Cited

U.S. PATENT DOCUMENTS

| | | | |
|---|---|---|---|
| 2010/0064250 A1* | 3/2010 | Schroeder | G06F 3/0485 |
| | | | 715/784 |
| 2012/0291056 A1* | 11/2012 | Donoghue | H04N 21/47214 |
| | | | 725/5 |
| 2014/0015863 A1* | 1/2014 | Grieve | G09G 5/34 |
| | | | 345/660 |
| 2014/0189579 A1* | 7/2014 | Rimon | G06F 3/04883 |
| | | | 715/784 |
| 2015/0332198 A1* | 11/2015 | Toro | G06Q 10/06393 |
| | | | 705/7.39 |
| 2016/0240097 A1* | 8/2016 | Bensley | G09B 19/0092 |
| 2017/0039168 A1* | 2/2017 | Hassan | G06F 40/123 |
| 2017/0116658 A1* | 4/2017 | Baid | G06Q 30/0625 |
| 2017/0242555 A1* | 8/2017 | Wragg | H04L 67/10 |
| 2018/0088788 A1* | 3/2018 | Cheung | G06F 3/04855 |
| 2020/0065360 A1* | 2/2020 | Cheung | G06F 40/137 |

\* cited by examiner

INTELLIGENT NAVIGATION VIA A TRANSIENT USER INTERFACE CONTROL

RELATED APPLICATION

This application is a continuation application of U.S. patent application Ser. No. 15/276,724, filed Sep. 26, 2016, which is incorporated by reference.

BACKGROUND

A hierarchical set of items may be organized with one or more items at a topmost level. The item at the topmost level may be referred to as a root node. The root node contains one or more nested items. A nested item may be referred to as a child node, nested child, sub-item, or child item. The nested item may also contain one or more nested items. A node that does not contain a nested item may be referred to as a leaf node. Each nested item is contained within at least one item at a higher-level within the hierarchy, which may be referred to as a parent node. A hierarchical set of items may include a few items, hundreds of items, or even thousands of items or more. Each item may include a single nested item, hundreds of nested items, or even thousands of nested items or more. Navigating through the hierarchical set of items on a display is frequently difficult and time consuming for users where the hierarchy includes large numbers of nested items at multiple different levels within the hierarchy.

SUMMARY

One example provides for intelligent navigation of a hierarchical set of items. A current group of items among a plurality of groups of items viewed by a user is automatically detected. A transient user interface control directed to the detected current group of items is presented for display. An action is performed on the detected current group of items based on input received from the user via the presented transient user interface control. A result of the performed action is presented for display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
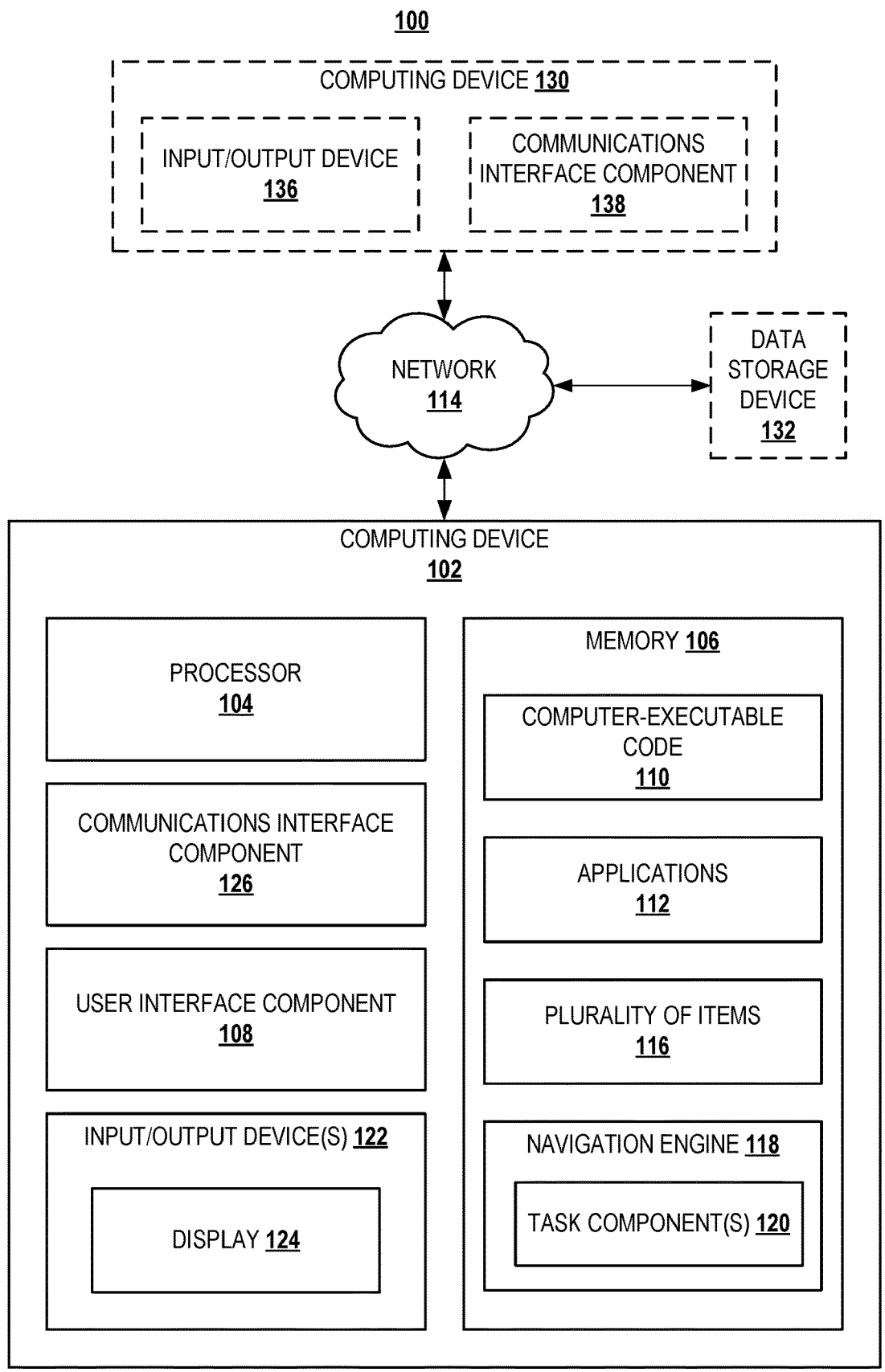
FIG. 1 is an exemplary block diagram illustrating a computing environment for intelligent navigation of hierarchical groups of items.

Referring to the figures, examples of the disclosure enable intelligent navigation of items in a hierarchy via dynamically generated navigational aids. In some examples, the navigational aids include a contextual breadcrumb list associated with a contextual user interface control. In some examples, the contextual breadcrumb list includes a set of nodes representing a path from an item at a first level of the hierarchy to a set of current items at a current level within the hierarchy.

Aspects of the disclosure enable automatic generation of the navigational aids based on a user navigating through at least a portion of the hierarchical set of items. The user navigations include, for example and without limitation, scrolling, viewing, or zooming associated with one or more items within the portion of a hierarchical list of items. The navigational aids are generated without a user clicking or selecting a node or item in a hierarchy. This enables increased speed and efficiency during user navigation through a complex hierarchical set of items. The navigation aids further improve user interactions and ease navigating complex data trees via the transient user interface control providing the contextual breadcrumb list.

Other examples provide a set of actions performed on items at a current level within the hierarchy represented by the contextual breadcrumb list. The set of actions may include a scoped sort, a scoped search, or a scoped filter. The set of actions are scoped such that the action is performed only within the current level to narrow and further focus the sort, search, or filter operations. This reduces processor load and improves processor speed by narrowing the number of items to be included within the search, sort, or filter actions.

In some examples, the contextual breadcrumb list is dynamically generated based on user-defined context, such as scrolling, pinching, zooming, or otherwise navigating through the items without user-selection of individual items in the list. As the user navigates, the breadcrumbs autoappear. This dynamic, contextual breadcrumb list enables users to search, sort, and filter a hierarchical list of items via a transient control that automatically updates as the user navigates through different portions of the hierarchical list.

Still other examples provide a transient scroll path. The transient scroll path is a contextual breadcrumb list that only includes items viewed by the user for a threshold scroll pause time or scrolled through at a rate below a threshold scroll rate. The pause or slower scroll rate indicates user interest associated with the one or more items. The transient scroll path provides a more focused contextual breadcrumb list to improve user efficiency and improve ease of navigation through large data sets presented to the user in complex hierarchical trees.

Referring again to FIG. 1, an exemplary block diagram illustrates a computing environment for intelligent navigation of hierarchical groups of items. The computing system 100 is a system for providing navigational aids to assist users navigating nested items within a hierarchy. The computing system 100 includes one or more computing devices, such as computing device 102.

In the example of FIG. 1, the computing device 102 associated with at least one user. The computing device 102 represents any device executing instructions (e.g., as application programs, operating system functionality, or both) to implement the operations and functionality associated with the computing device 102. The computing device 102 may be implemented as a mobile computing device or any other portable device. In some examples, the mobile computing device includes a mobile telephone, laptop, tablet, computing pad, netbook, gaming device, and/or portable media player. The computing device 102 may also include less portable devices such as servers, desktop personal computers, kiosks, tabletop devices, and industrial control devices. Additionally, the computing device may represent a group of processing units or other computing devices.

In some examples, the computing device 102 includes at least one processor 104, a memory 106, and at least one user interface component 108. The processor 104 includes any quantity of processing units, and is programmed to execute computer-executable code 110 for implementing aspects of the disclosure. The computer-executable code 110 may be referred to as computer-executable instructions. The computer-executable code 110 may be performed by the processor 104 or by multiple processors within the computing device 102, or performed by a processor external to the computing device 102. In some examples, the processor 104 is programmed to execute instructions such as those illustrated in the figures (e.g., FIG. 13, FIG. 14, FIG. 15, FIG. 16, and FIG. 17).

In some examples, the processor 104 represents an implementation of analog techniques to perform the operations described herein. For example, the operations may be performed by an analog computing device and/or a digital computing device.

The computing device 102 further has one or more computer readable media such as the memory 106. The memory 106 includes any quantity of media associated with or accessible by the computing device 102. The memory 106 may be internal to the computing device (as shown in FIG. 1), external to the computing device (not shown), or both (not shown). In some examples, the memory 106 includes read-only memory and/or memory wired into an analog computing device.

The memory 106 stores data, such as one or more applications 112. The applications 112, when executed by the processor 104, operate to perform functionality on the computing device 102. Exemplary applications include mail application programs, web browsers, calendar application programs, address book application programs, messaging programs, media applications, location-based services, search programs, and the like.

In some examples, the applications 112 may optionally communicate with counterpart applications or services, such as web services accessible via a network 114. For example, the applications 112 may represent downloaded client-side applications that correspond to server-side services executing in a cloud.

The memory 106 further stores a plurality of items 116. The plurality of items includes two or more items. In this non-limiting example, the plurality of items is a plurality of groups of items in a hierarchy. A group includes one or more items at a given level within the hierarchy.

An item in the plurality of items 116 may include a folder, a file, an object, an image, a word, a picture, a document, or any other type of data. An item may be a single item, as well as a nested item containing one or more other items. A nested item is an item containing one or more other items. For example, the plurality of items 116 may include one or more items at a first level. An item at a first level may be referred to as a root node. Each root node includes one or more nested items. The nested items are on a second level. A nested item at the second level may include one or more nested items at a third level and so forth.

The memory 106 in this example further includes a navigation engine 118. The navigation engine 118 is a software component executed on the one or more processors, such as processor 104 to generate navigational aids based on input received from a user. The navigation engine leverages the context the user is interacting with within a hierarchical tree of items to provide the navigation aids. The navigation aids facilitate the user locating an item in the hierarchical tree.

In some examples, the navigation engine automatically detects the current user navigations within the tree to provide navigation aids within the tree structure. The navigation includes moving to different levels in the hierarchy, switching between siblings in a same level, and viewing one or more items at a particular level.

The memory 106 further stores one or more computer-executable components. Exemplary components include a navigation engine 118. In some examples, the navigation engine 118 includes one or more task component(s) 120 for performing a task. A task is an action performed on a data set, such as searching, sorting, filtering, or otherwise manipulating items. The task component(s) in this non-limiting example include, for example but without limitation, a scoped sort, a scoped search, and a scoped filter.

The scoped filter filters a subset of items within a plurality of items based on user context while navigating through at least a portion of the plurality of items and/or input received from the user. The scoped filter action in some examples may include filtering a subset of items in the plurality of items in accordance with one or more criteria. A criteria may include an attribute, a file type, an image, a file size, an image size, a font size, a coloration, a keyword, a tag, a file type, a date, a time, an icon, or any other criteria.

The scoped sort performs a sort action on a subset of items in the plurality of items to change an order of the subset of items. The sort is performed in accordance with a current user context during navigation of the plurality of items and user input, such as one or more criteria. The scoped sort in some examples sorts a subset or group of items alphabetically, chronologically, numerically, or according to any other criteria.

The scoped search performs a search action within a subset of items in the plurality of items to identify one or more items within the subset corresponding to one or more search criteria. The search is performed in accordance with the current user context during navigation of the plurality of items and user input, such as the one or more criteria.

The navigation engine 118 component, when executed by the processor of the computing device 102 causes the processor to automatically detect a current group of items among the plurality of items 116 viewed by a user; present a transient user interface control directed to the detected current group of items to the user via an output device; perform an action including a search or sort of the detected current group of items based on input received from the user via the presented transient user interface control; and present a result of the performed action to the user.

In some examples, presenting the transient user interface control, a breadcrumb list, and/or results of a performed action to the user includes presenting visual data, such as graphics or text, in a display generated by a display device. In other examples, presenting the transient user interface control, a breadcrumb list, and/or results of a performed action to the user includes presenting the data via an audio output, such as natural language or other sounds. The transient user interface control, a breadcrumb list, and/or results may also be presented via a combination of audio, visual, haptic, or other types of output.

Likewise, a hierarchical set of items may be provided to the user in a visual format, such as text or graphics, presented by a display device. In other examples, the items may be presented to the user in an audio format. The audio format may include natural language as well as non-language related sounds, such as beeps or other sounds.

The term "transient" refers to the user interface control being displayed as the user scrolls and being updated as the scroll path changes. When user navigation ceases, in some examples, the user interface control is no longer displayed (e.g., after a timeout period). Thus, the transient user interface control is non-persistent.

The computing device 102 includes one or more input/output device(s) 122 for receiving input from the user and outputting navigational aids, such as a contextual breadcrumb list and/or results of performing an action on a group of items in the plurality of items 116, to the user. In some examples, the contextual breadcrumb list contains a plurality of nodes representing each item in a path leading from an item at a first level to one or more items at a current level being viewed by a user to a root node.

In one example, a node in the contextual breadcrumb list is a graphic or control representing a given level within the hierarchy of items. The graphic may include an icon, symbol, alphanumeric, or other graphical representation. In another example, a node in the contextual breadcrumb list is a graphic representing one or more items within the hierarchy of items. In still another example, a node in the contextual breadcrumb list is a graphic representing a group of two or more items within the same level of the hierarchy. In yet another example, a node within the contextual breadcrumb list represents both an item and a given level of the item within the hierarchy of items. In yet another example, a node in the breadcrumb list is a graphic representing a group of two or more items at a given level within the hierarchy.

The navigation engine received input from the user via input/output device(s) 122. The input/output device(s) 122 may include a camera, speaker, keyboard, mouse, touch screen, speaker, voice recognition system, or any other type of input or output device.

In this example, the input/output device(s) includes a display device 124. The display device 124 may be implemented as any type of device for presenting data to a user, such as, but without limitation, one or more of the items from the plurality of items 116, a transient user interface control or results of the performed action. The display device 124 may include, without limitation, a display screen, a touch screen, a liquid crystal display (LCD), a projector, or any other type of display device.

In some examples, the computing device 102 includes a communications interface component 126. The communications interface component 126 includes a network interface card and/or computer-executable instructions (e.g., a driver) for operating the network interface card.

The computing device 102 may be self-contained (e.g., not rely on other devices for processing or storage). For example, the computing device 102 may perform the operations described herein, and store any results, within the computing device 102 itself. In other examples (shown as dashed lines in FIG. 1), the computing device 102 communicates with other devices, such as computing device 130 and data storage device 132 via network 114, for processing or storage support.

Communication between the computing device 102 and the other devices, such as computing device 130 and data storage device 132, may occur using any protocol or mechanism over any wired or wireless connection. In some examples, the communications interface component 126 is operable with short range communication technologies, such as by using near-field communication (NFC) tags.

In some examples, the user views one or more items from the plurality of items on a display of the computing device 102. The user provides input via the input/output device(s) 122 to the navigation engine 118. The user views the navigational aids via the display device 124.

In other examples, the computing device 102 connects to one or more remote computing devices, such as computing device 130 and data storage device 132, via the network 114. The network 114 may include any type of network connection, such as a local area network (LAN), a wide area network (WAN), a BLUETOOTH, Wi-Fi, cellular network, or any other network connection. In some examples, the network 114 is the Internet.

The data storage device 132 may include one or more spinning magnetic disks or solid state drives. A data storage device in some examples includes, without limitation, one or more hard disks, one or more flash drives, as well as any other type of device for storing data. The data storage device 132 in other examples includes a redundant array of independent disks (RAID) array. In still other examples, the data storage device includes one or more cloud storage on a public or private cloud accessible via the network.

In some examples, the data storage device 132 stores metadata associated with one or more items in the plurality of items. Metadata is data about other data. The scoped search, scoped filter, and/or scoped sort may be performed using metadata associated with one or more items retrieved from the data storage device 132.

In this example, the data storage device 132 is located remotely from computing device 102. In other examples, the data storage device 132 is located internally to computing device 102 or connected to computing device 102 as a peripheral device (not shown).

In these examples, the user may view one or more of the plurality of items 116 on a display device within input/output device 136 on the computing device 130 (e.g., a remote computing device). The computing device 130 sends user input from the computing device 130 to the navigation engine 118 on computing device 102 via the communications interface component 138. The computing device 102 transmits navigational aids back to the computing device 130 for display to the user. In this manner, one or more users associated with one or more computing devices obtain navigational aids from the navigation engine 118 located on a server or another remote computing device.

In some examples, the user interface component 108 includes a graphics card for displaying data to the user and receiving data from the user. The user interface component 108 may also include computer-executable instructions (e.g., a driver) for operating the graphics card. Further, the user interface component 108 may include a display (e.g., a touch screen displays or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way.

Figure 2:
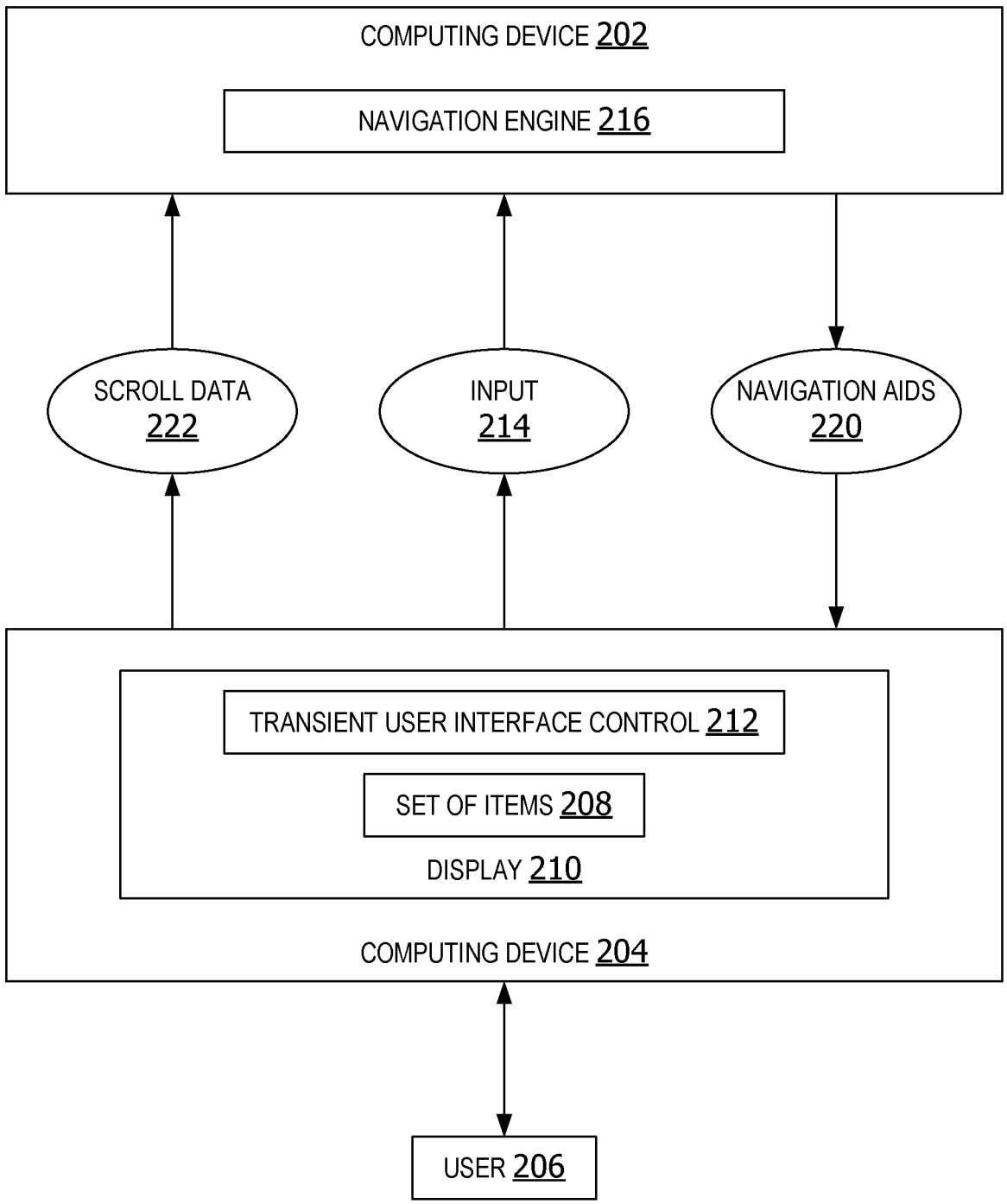
FIG. 2 is an exemplary block diagram illustrating a system for intelligent navigation of hierarchical groups.

Referring now to FIG. 2, an exemplary block diagram illustrating a system for intelligent navigation of hierarchical groups is shown. The computing system 200 includes one or more computing devices, such as computing device 202 and computing device 204. The computing devices may be connected via a network connection, such as, but without limitation, the network 114 in FIG. 1.

In this example, a user 206 views a set of items 208 from a plurality of items on a display 210 associated with a computing device 204. The set of items 208 includes one or more items from the plurality of items that are being viewed by the user. In some examples, the set of items 208 includes one or more items currently being displayed to the user on the display 210. In this non-limiting example, the set of items 208 includes items within the same level of a hierarchy of the plurality of items.

In this example, a transient user interface control 212 is presented to the user in the display. The transient user interface control is a user interface providing a set of navigational aids to assist the user 206 in navigating through the plurality of items. The term "transient" refers to the fact that the user interface control is displayed temporarily or transiently during user navigation through items in the plurality of items within the hierarchy. In some examples, the transient user interface control 212 is displayed when a user begins scrolling or otherwise navigating through items without selecting any of the items being viewed or displayed during the navigation.

A user may select one or more items being viewed or displayed by clicking on an item, gazing at an item, touching an item, speaking, gesturing, or any other selection means. In some examples, a user selects an item by providing a verbal identification of the item. In other examples, the user selects an item by using a mouse, keyboard, touch screen, touch pen, or other input device to click on one or more items.

In some examples, the transient user interface control 212 includes a contextual breadcrumb trail representing a path from a root node in the plurality of items to the set of items 208 currently being viewed by the user 206. However, in other examples, the transient user interface control does not include the contextual breadcrumb list. The contextual breadcrumb list may be presented separately from the transient user interface control or presented without the transient user interface control.

In this example, the transient user interface control 212 includes a graphical user interface (GUI). A user may select one or more icons or other graphical representations within the GUI to perform actions associated with the set of items, such as sort, filter, and search actions.

The user 206 generates input 214 in some examples via the user interface. The input initiates performance of an action on the set of items 206. The action may include scrolling through a portion of the plurality of items, zooming in on one or more items, or zooming out. As used herein, scrolling includes the action of moving displayed text or images up or down vertically, as well as moving displayed text or images left to right.

Scrolling may be performed via a scroll bar in some examples. Scrolling may be performed via an input device, such as a mouse, keyboard, touch screen, or another input device. A user may perform scrolling by using a mouse to scroll, keyboard, by touch, by gesture, by eye movement, or any other scroll technique.

In some examples, scrolling includes touch based scrolling, gesture detection, and tracking eye movements of a user. In other examples, scrolling is detected via input received from a mouse, keyboard, mouse pen, or touchscreen. In still other examples, scrolling is detected via motion detectors, cameras, microphones, voice/speech recognition, or via tracking of eye movements/direction of gaze of the user.

For example, the system may detect scrolling by monitoring a direction of gaze of a user looking at the list of items on the display. In other examples, the scrolling is detected via a user moving at least one finger or thumb along a scroll bar display on a touch screen. In still other examples, scrolling is detected via a movement of a mouse or finger movements on a touch pad indicating scrolling. In yet another example, a user performs scrolling by giving a verbal command to scroll up or scroll down which is detected/recognized by a speech recognition system.

Zooming in and zooming out in some examples includes a pinch action on a touch screen to pinch-in or pinch-out. Pinching includes moving a finger and thumb together or apart on a touch screen or in front of a camera or other motion detection device to zoom out, zoom in, expand or contract an image being viewed on a display.

In some examples, the computing device 204 sends the input 214 to the navigation engine 216 to trigger generation of navigation aids 220. The navigation aids 220 in some examples include a contextual breadcrumb list which is displayed within the transient user interface control 212. The contextual breadcrumb list includes a node representing each parent item in a path from the root node to the current set of items 208 being viewed by the user 206.

In other examples, the navigation engine 216 automatically generates the navigational aids 220 when the navigation engine 216 receives scroll data 222 indicating that the user 206 is scrolling through at least a portion of the plurality of items. In some examples, the scroll data 222 is generated when a user scrolls up or scrolls down through a list of items, such as the set of items 208 or a portion of the plurality of items.

In other examples, the scroll data 222 is generated when a user stops scrolling for a threshold period of time before resuming scrolling associated with the plurality of items. The threshold period of time may be referred to as a threshold pause time. In other examples, the scroll data 222 is generated when a user's rate of scrolling through items in the hierarchical tree is less than or equal to a threshold scroll rate.

In this example, the navigation engine 216 is located on a first computing device and the transient user interface control is displayed to the user via a second computing device located remotely to the first computing device. For example, the first computing device may transmit the navigational aids for display via the transient user interface control displayed on a portable computing device, such as a smart phone or smart watch. However, in other examples, the navigation engine 216 and the transient user interface control 212 are implemented within the same computing device.

Figure 3:
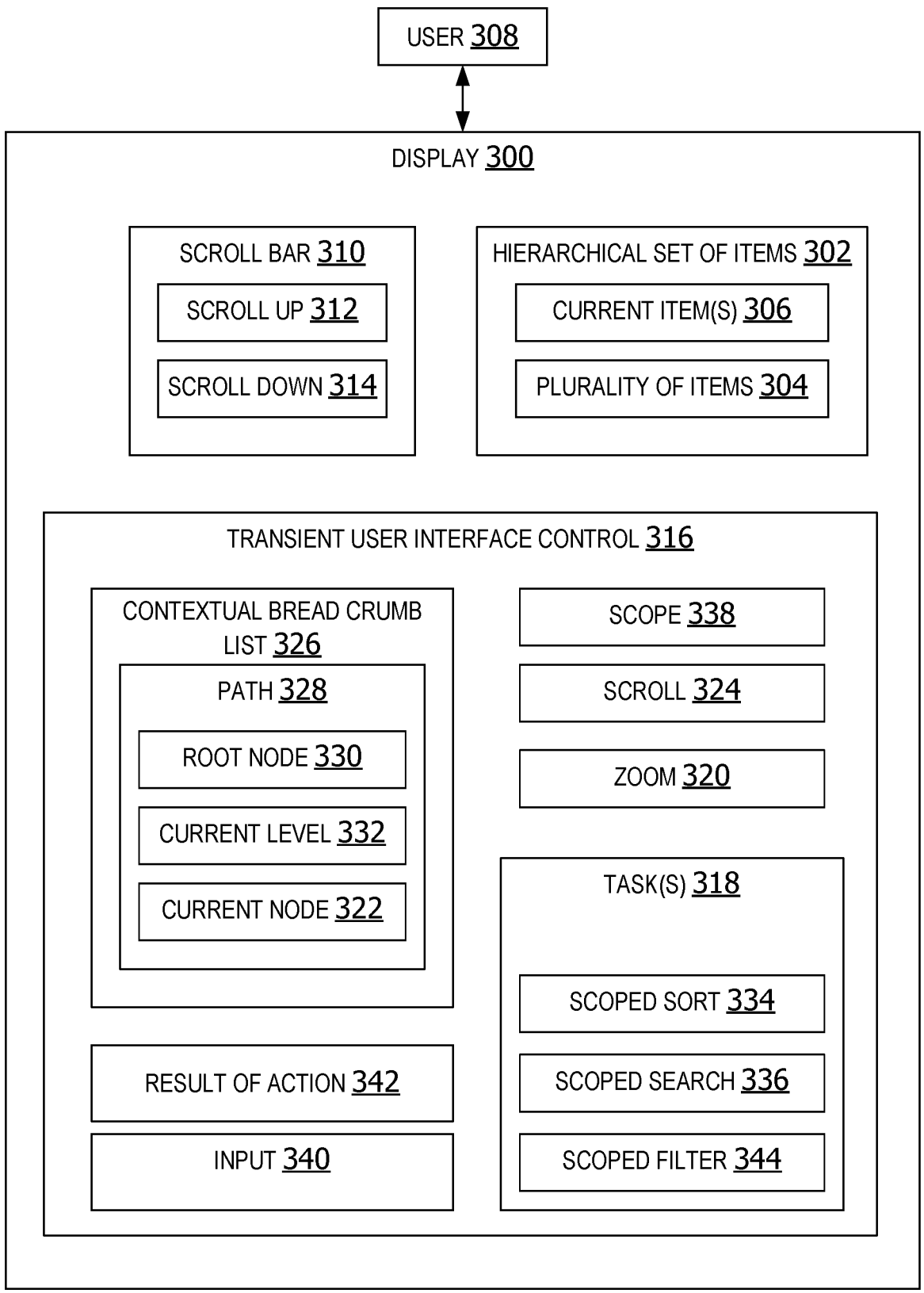
FIG. 3 is an exemplary block diagram of a display presenting a transient user interface control.

FIG. 3 is an exemplary block diagram of a display presenting a transient user interface control. Display 300 is a display generated by a display device, such as, but not limited to, display device 124 in FIG. 1. The display 300 presents a hierarchical set of items 302. The hierarchical set of items 302 includes a plurality of items 304 in a hierarchical order or organized into hierarchical levels. The current item(s) 306 includes one or more items in the plurality of items 304 being viewed by the user 308.

The display in this example includes a scroll bar 310. The scroll bar 310. The user 308 utilizes the scroll bar 310 to scroll up 312 or scroll down 314 through a portion of the hierarchical set of items 302.

As used herein, the term "scroll up" may refer to utilizing a vertical scroll bar to scroll up or utilizing a horizontal scroll bar to scroll through items. In some examples, scrolling up refers to scrolling through items in a hierarchical tree towards a higher level within the tree. As used herein, the term "scroll down" may refer to a user utilizing a horizontal scroll bar and/or a vertical scroll bar. Scrolling down may refer to scrolling through a hierarchical tree towards a lower level within the tree.

The user 308 may utilize the scroll bar 310 via an input device, such as a touch screen, a keyboard, a mouse, a microphone for receiving verbal commands, a camera enabling gesture detection, or any other type of device or method for receiving input from a user. In other words, a user may manipulate the scroll bar 310 using touch, voice, hand gesture, eye movement, or any other type of input indicating a scroll up 312 or scroll down 314.

A transient user interface control 316 is a user interface presented to the user 308 on the display 300. The transient user interface control 316 includes one or more navigational aids to assist the user in navigating through the hierarchical set of items 302. The transient user interface control 316 is automatically generated and displayed to the user dynamically in response to the user navigating through at least a portion of the items in the hierarchical set of items 302. In some examples, the user navigates through the items by performing a zoom 320 or a scroll 324.

A zoom 320 includes zooming in or zooming out. A zoom 320 in other examples includes a pinch, such as by moving a finger and thumb together or apart to perform a function. The zoom 320 may be performed to open a folder, magnify an image, shrink an image, or change a document view. For example, a user may zoom in on a folder to open the folder up, which triggers an automatic generation of the contextual breadcrumb list representing a path from a root node to the opened folder.

A scroll 324 includes scrolling up and scrolling down. The scroll 324 may be performed using a scroll bar 310 control.

In response to the user 308 performing a zoom 320, scroll 324 or other navigation associated with one or more current item(s) being viewed on display 300 by the user 308, the navigation engine automatically generates a contextual breadcrumb list 326.

The contextual breadcrumb list 326 represents a path 328 through the hierarchical set of items 302 from a root node to a current node 322. The current node represents one or more current item(s) 306 being viewed at a current level of the hierarchy. In this example, the contextual breadcrumb list 326 includes two nodes, the root node 330 and the current node 322. In other examples, the contextual breadcrumb list 326 includes any number of nodes.

The contextual breadcrumb list 326 in this example is displayed within the transient user interface control 316. The contextual breadcrumb list 326 includes a current node representing at least one item in the current level 332 and one or more nodes representing each parent node of the current node. A node may be presented within the contextual breadcrumb list as an icon, button, symbol, alphanumeric, or other graphic to represent a given node. A user may select a node within the contextual breadcrumb list to view items within the hierarchical level represented by the selected node. In other words, the user navigates to a higher level in the hierarchy by selecting a breadcrumb in the contextual breadcrumb list.

In some examples, the user may select two or more nodes to display items corresponding to the two or more nodes while excluding the items associated with the unselected nodes. In this manner, a user may collapse the excluded nodes in between other nodes. This helps the user perform other operations, such as moving an item from under one node to under a more distant node without having to traverse multiple nodes or levels.

In some examples, the user may perform a task 318. A task is an action to manage, filter, sort, search, organize, or otherwise manipulate at least a portion of the items in the hierarchical set of items. In this example, the task 318 includes a scoped filter 344, a scoped sort 334, and a scoped search 336.

In some examples, the scope is the current level within the hierarchy. In other examples, the scope is a current subset of items within the current level. In other words, the scope may include all siblings within a given level or be limited to only a single sibling in the given level. The user may change the scope by selecting a higher level within the hierarchy for the scoped sort, search, or filter. In some examples, the user changes the scope by selecting one or more nodes in the contextual breadcrumb list or the transient scroll list. In still other examples, the default scope is the current context until the user selects to change the scope.

The scoped filter 344 filters items within the current level of the current items 306 in accordance with one or more user selected filter criteria. In this example, the scoped filter filters only the current items 306 and items nested within the current items 306. The scoped filter 344 does not filter items higher in the hierarchy of items. In other words, the scoped filter 344 does not filter all items in the hierarchical set of items. It only filters items within the context of the current level being viewed or scrolled through by the user.

The filter criteria may include any user selected criteria. In some examples, filter criteria may include, without limitation, date, price, color, age, category, name, or any other selected criteria.

In other examples, the scoped sort 334 performs a sort within the context 338 of the current level 332 of the hierarchical set of items 302. The current context 338 is the current level 332 being viewed by the user. In other examples, the context 338 is the one or more levels the user is interacting within the hierarchical tree of items.

The current context 338 limits the scope of the scoped sort. In other words, the scoped sort 334 performs a sort on two or more items within the current level 332. The sort is transient because the sort is only performed within the current level represented by the contextual breadcrumb list 326.

Likewise, the scoped search 336 in this example is only performed within the current level represented by the contextual breadcrumb list 326. The search is performed in accordance with one or more criteria within the current level of the hierarchical tree. In some examples, the scoped search 336 includes a fuzzy search. A fuzzy search returns search results that do not exactly match the search terms. In other words, the fuzzy search returns results that are close but not exactly matching the search terms.

The user 308 performs a task via input 340 provided by the user. The input 340 is provided via an input device, such as, but not limited to, input/output device(s) 122 in FIG. 1. In some examples, the user provides input by selecting an icon or other graphical control on display 300, such as scroll bar 310.

In some examples, the navigation engine presents the results 342 of an action performed on the hierarchical set of items 302 within the transient user interface control 316. The results 342 of an action are the results of a task performed within a given level of the hierarchy. For example, if the action performed is a scoped search, the search result is output to the user within the transient user interface control 316 as results 342. If a sort is performed, the scoped sort results are output as results 342.

In other examples, the navigation engine displays the results of the task 318 within a results area of the display that is separate from the transient user interface control 316. In this example, the transient user interface control provides the contextual breadcrumb list 326 and the result of the task 318. In other examples, results of the task 318 are provided in a separate results area (not shown) of the display 300.

Figure 4:
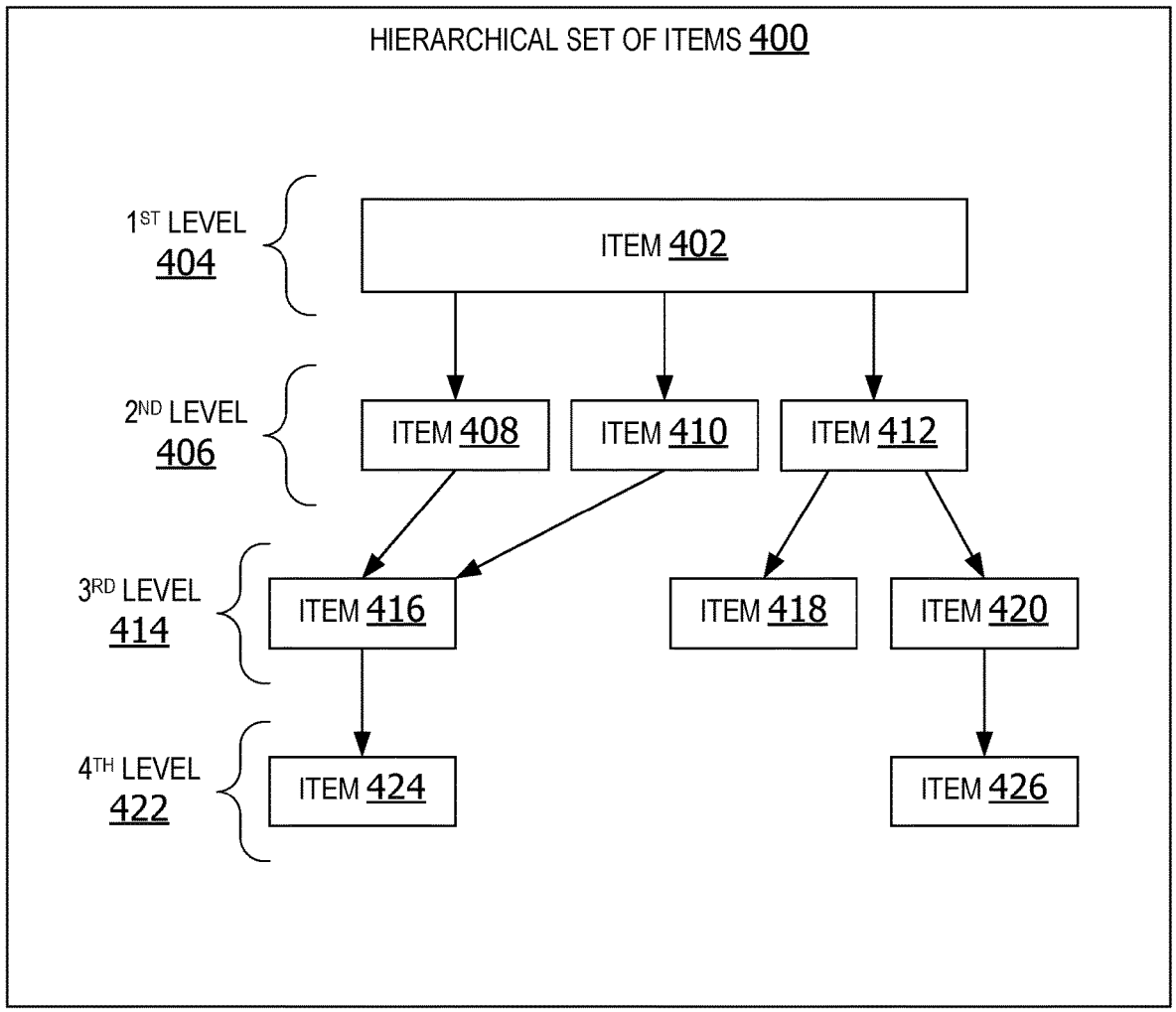
FIG. 4 is an exemplary block diagram of a hierarchical set of items.

FIG. 4 is an exemplary block diagram of a hierarchical set of items. The hierarchical set of items 400 in this example includes a plurality of items at a plurality of different levels. The hierarchical set of items in other examples includes a plurality of groups of items at a plurality of different levels.

The hierarchical set of items 400 may be referred to as a hierarchical tree of items. In some non-limiting examples, the hierarchical set of items 400 includes one or more hierarchical file systems including a plurality of files.

In this example, item 402 is an item at a highest or first level 404. The item 402 includes one or more nested items at a second level 406. In this example, the nested items at the second level 406 include item 408, item 410, and item 412. However, an item is not limited to three nested items. An item may include any number of nested items. In some examples, an item may include only a single nested item, as well as two or more nested items. An item may include dozens of nested items, hundreds of nested items, or even thousands of nested items.

Each nested item at the second level may include no nested items, a single nested item, as well as two or more nested items. In this example, items 408 and 410 include nested items 416 at the third level 414. The item 412 at the second level in this example includes nested items 418 and 420 at the third level 414.

Likewise, the nested items 416 at the third level includes a nested item 424 at the fourth level. The nested item 420 also includes nested item 426 at the fourth level. The item 418 at the third level does not include any additional nested items.

In one example, if the current items being viewed by a user includes item 426, the contextual breadcrumb list includes a node representing item 426, item 420, item 412, and item 402. In this manner, the contextual breadcrumb list represents the path from the current item 426 at the current level 422 to item 402, which is represented in the contextual breadcrumb list by the root node.

In another example, if the user scrolls, zooms, pinches, or otherwise opens item 416 in the display, the contextual breadcrumb list includes a node representing the current item 416, parent item 408 and parent item 402. In another example, the contextual breadcrumb list includes a node representing item 416, a node representing both items 408 and 410, and a root node representing item 402.

The hierarchical set of items 400 in this example includes four levels. However, the examples are not limited to four levels. A hierarchical set of items 400 may include items at two levels, three levels, as well as five or more levels.

Figure 5:
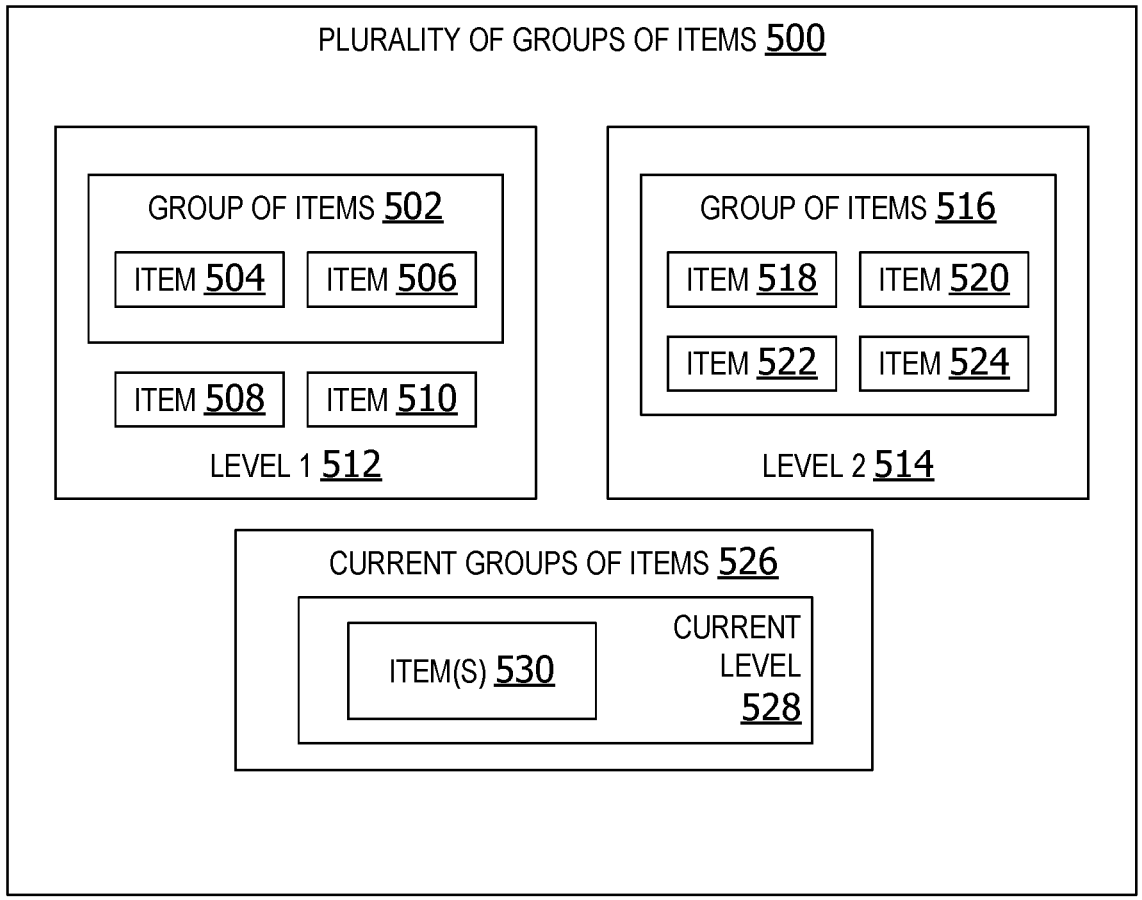
FIG. 5 is an exemplary block diagram of a plurality of groups of items.

Referring now to FIG. 5, an exemplary block diagram of a plurality of groups of items within a plurality of different levels is shown. The plurality of groups of items 500 includes two or more groups of items. Each group of items in the plurality of groups of items includes one or more items. Each item in a group of items may include no nested items, a single nested item, as well as two or more nested items.

In this example, group of items 502 is a group that includes nested items 504 and 506 at a first level 512. The first level also includes item 508 and item 510 which are not included in the group of items 502. In this example, item 504 includes a second group of items 516 at the second level 514.

The second group of items 516 in this example includes nested items 518, item 520, item 522, and item 524. In other words, items 518, 520, 522, and 524 are included within item 504.

The current groups of items 526 includes the one or more item(s) 530 currently being viewed by the user at the current level 528. The current groups of items are not limited to a single item at a single level. The current groups of items may include two or more items at a current level.

The current level 528 may be any level in the hierarchy. The current level 528 may include the first level 512, the second level 514, as well as any other level associated with the current group of items 526.

Figure 6:
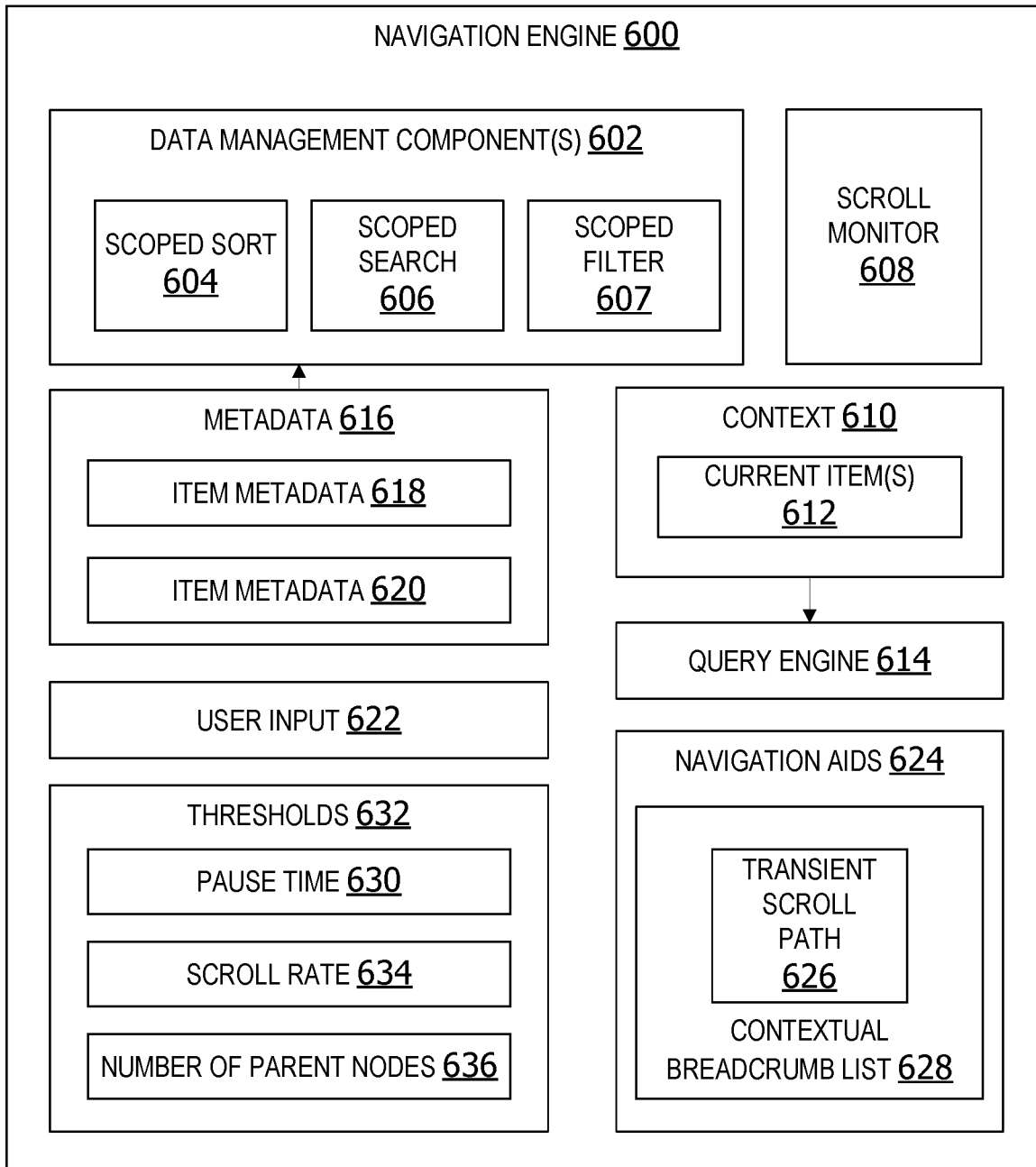
FIG. 6 is an exemplary block diagram of a navigation engine.

FIG. 6 is an exemplary block diagram of a transient scoped navigation engine. The navigation engine 600 in some examples includes task component(s) 602. The task component(s) 602 include a scoped sort 604 component for sorting two or more items at a current level within the hierarchy. The scoped sort 604 component sorts items at the current level of the contextual breadcrumb list in accordance with one or more sort criteria selected by a user. This may be referred to as in-tree sorting. The items may be sorted alphabetically, in order from least-to-greatest, chronologically (oldest-to-youngest or youngest-to-oldest), by cost (cheapest-to-most expensive), in numerical order, or in accordance with any other criteria.

The scoped search 606 component searches items at the current level of the contextual breadcrumb list in accordance with one or more search criteria selected by a user. This may be referred to as in-tree searching. The search criteria may include an alphanumeric search term, a symbol, a sound file, an image, or any other type of search criteria.

The scoped filter 607 component filters items at the current level of the contextual breadcrumb list in accordance with one or more user selected filter criteria. This may be referred to as in-tree filtering. The filter criteria may include attributes, age, name, cost, date, time, file type, tag, image, or any other criteria.

A scroll monitor 608 is a component for monitoring user scrolling through the plurality of items. The scroll monitor 608 in some examples receives scroll data from a user interface or other input device, such as a mouse, keyboard, touch screen, etc. The scroll monitor 608 determines whether a user is scrolling up, scrolling down, or paused scrolling at a given level within the hierarchy of items.

The scroll monitor 608 in some examples determines a rate at which the user is scrolling. In some examples, the scroll rate may refer to how many items the user scrolls through within a given unit of time.

The context 610 is the current level of the hierarchy of items. The navigation engine automatically determines the context or current level of the current items 612 being viewed by the user in response to a user scrolling or otherwise navigating through a portion of the hierarchy of items.

In some examples, the navigation engine 600 optionally includes a query engine 614. The query engine 614 queries a data storage device for metadata 616 associated with one or more items in the current level, such as item metadata 618 and item metadata 620. The item metadata may be utilized for performing the scoped search, scoped filter, or the scoped sort on one or more item(s). The metadata is optionally retrieved from a data storage device, such as, but without limitation, data storage device 132 in FIG. 1.

The navigation engine 600 receives input 622 from a user. The input 622 indicates if the user is currently navigating through a portion of the hierarchical set of items or if the navigation has stopped. The navigation triggers the navigation engine to generate navigation aids In some examples, the navigation includes scrolling. The scrolling triggers the navigation engine to generate navigation aids 624, such as the contextual breadcrumb list 628.

In other examples, the navigation engine 600 generates the contextual breadcrumb list 628 when the user pauses in scrolling at the current item(s) 612 for a threshold pause time 630. The threshold pause time is a pre-determined period of time during which the user stops or slows scrolling enough at a given item or group of items in the hierarchical list. In these examples, the scroll monitor 608 automatically identifies the current item(s) 612 displayed when a user stops scrolling for a period of time that exceeds the threshold pause time before the user resumes scrolling. The navigation engine 600 automatically generates and displays the contextual breadcrumb list 628 representing the current item(s) corresponding to the pause in the user scrolling.

The threshold pause time 630 is a pre-determined value in a set of user defined thresholds 632. The set of user defined thresholds 632 may optionally include a threshold scroll rate 634 and/or a threshold number of parent nodes 636 to be included within a contextual breadcrumb list 628 or a transient scroll path 626.

The threshold scroll rate 634 is a rate or speed with which the user scrolls through a portion of the hierarchical set of items. In some examples, the navigation engine 600 automatically generates the contextual breadcrumb list 628 or the transient scroll path 626 when the user scrolls through the current item(s) 612 at a pre-determined speed or rate that is slower than a threshold speed or rate of scrolling. In other words, when a user scrolls at a slower rate than the threshold rate, the scroll monitor 608 identifies the current item(s) corresponding to the slower scroll speed. The navigation engine 600 then generates the contextual breadcrumb list 628 based on the current item(s) viewed by the user at the slower scroll speed.

In other examples, the navigation aids include a transient scroll path 626. The transient scroll path 626 represents nodes in a path from a parent node to a current node associated with a threshold scroll time or the threshold scroll rate. In other words, a node is added to the transient scroll path 626 if a user stops scrolling at one or more items associated with that node or if the user scroll rate is less than or equal to the threshold scroll rate while viewing the one or more current items. Unlike the contextual breadcrumb list 628 which includes every parent node within a path from a root node to a current node, if a user scrolls quickly through one or more nodes at a rate that exceeds the threshold scroll rate the nodes are not included in the transient scroll path, collapsing the nodes or items in between.

In some examples, the navigation engine determines a user's interest in one or more items within the hierarchical set of items based on the rate or speed with which the user scrolls through those items. If a user stopped scrolling to view items at a given level or slowed scrolling to view items, nodes representing these levels are added to the transient scroll path. In other words, the transient scroll path 626 only includes those nodes within the path at which the user paused scrolling or scrolled at a rate equal to or slower than the threshold scroll rate.

This provides the user with indicators representing those nodes of interest while excluding nodes that are of less interest or of no interest as indicated by the user scrolling at a quicker or more rapid rate or without pausing to look at the one or more item(s). In contrast, the contextual breadcrumb list 628 in this example includes every node in the path from the root node to the current level through which the user scrolled regardless of how quickly the user scrolled through the item or whether the user stopped scrolling at any point.

In some examples, the transient scroll path 626 includes an indicator that a representation of one or more nodes in the path from the root node to the current node has been excluded from the transient scroll path. For example, a contextual breadcrumb list representing a path from a root node to the current node at the current level in one example is as follows:

Root node A; parent node B; parent node C; and current node D.

In this example, the user paused or slowed scrolling to at or below the threshold scroll rate at the parent node, node C and node D but scrolled quickly through node B without slowing or pausing. Thus, the transient scroll map 626 in this example would include:

Root node A; parent node C; current node D.

In the example shown above, only a single node is omitted from the transient scroll path. However, in other examples, any number of nodes may be omitted from the transient scroll path. Moreover, parent node C is italicized to indicate one or more parent nodes have been omitted from the scroll path. The examples are not limited to italicizing. An indicator of an excluded node may include underlining, changing font size, changing font color, adding a dash, adding a space, adding a symbol, adding an icon, adding an alphanumeric, or any other indicator showing one or more parent nodes are excluded from the path.

In some examples, the transient user interface control includes an icon or other control selectable by a user to change the contextual breadcrumb list showing all parent nodes to the transient scroll path showing only those nodes at which the user paused or slowed scrolling. Likewise, a user viewing the transient scroll path 626 in some examples selects the control to change the transient scroll path 626 to the contextual breadcrumb list 628.

In some examples, the user selects a threshold pause time control to select the threshold pause time. In other examples, the user selects a threshold scroll rate control within the transient user interface control to select the threshold scroll rate. In still other examples, the threshold pause time and the threshold scroll rate are pre-determined, default threshold values rather than user defined threshold values.

In other examples, the contextual breadcrumb list 628 may include only two nodes, dozens of nodes, or even hundreds of nodes representing levels within the hierarchy from the root node to the current node. If the contextual breadcrumb list 628 is too long to view all nodes within the display, the transient user interface optionally includes a transient scroll bar enabling a user to scroll through the contextual breadcrumb list 628.

For example, if a contextual breadcrumb list 628 includes fifteen nodes and only ten nodes fit within the current display space, the user utilizes a transient scroll bar within the transient user interface control to scroll up and down or scroll left and right through the nodes within the contextual breadcrumb list. As the user scrolls in one direction, the contextual breadcrumb list displays nodes moving up through the hierarchy towards the root node. As the user scrolls in the opposite direction, the contextual breadcrumb list displays nodes moving down through the hierarchy towards the current level. A transient scroll bar may be oriented to scroll up and down, as well as scrolling left-to-right.

However, in still other examples, the contextual breadcrumb list 628 only includes a threshold number of parent nodes 636 representing a path from the current level to one or more parent nodes. If the threshold number of parent nodes is six and a path from the current node to the root node is ten nodes, the contextual breadcrumb list 628 only includes the six nodes starting from the current level up to the fifth parent node while excluding the root node. In other words, the contextual breadcrumb list 628 does not include the root node and other parent nodes exceeding the threshold number. Utilizing the threshold number of parent nodes 636 to be included within a contextual breadcrumb list or a transient scroll path enables a portion of a long chain of nodes in a path to be displayed within the transient user interface control without a transient scroll bar.

In some examples, the transient user interface control includes an icon or user selectable control to enable a user to select or set the threshold number of parent nodes 636 or to disable the threshold number of parent nodes. For example, a user selects the control to display only a given threshold number of parent nodes within the contextual breadcrumb list or transient scroll path. In other examples, the user selects the control to disable the threshold number of parent nodes and restore the contextual breadcrumb list or transient scroll path to include every node in the path from the current node to the root node.

In some examples, the threshold number of nodes is a user defined number selected by the user dynamically during viewing of the hierarchical set of items. In still other examples, the threshold number of nodes is a default threshold number of nodes.

Figure 7:
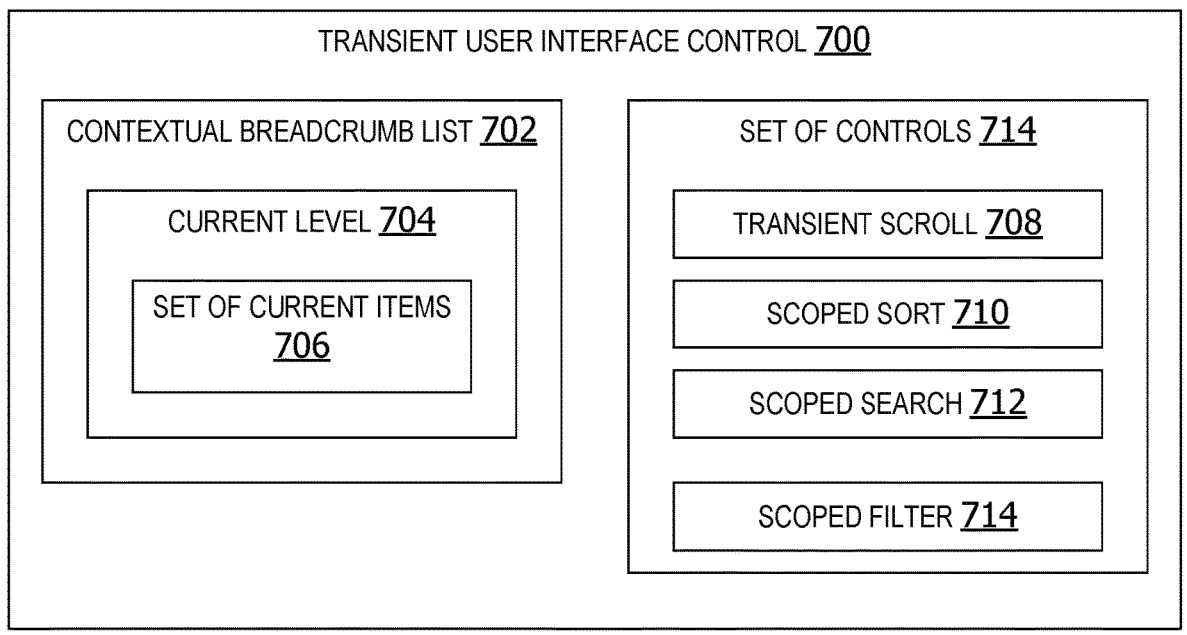
FIG. 7 is an exemplary block diagram of a transient user interface control.

FIG. 7 is an exemplary block diagram of a transient user interface control. The transient user interface control 700 is presented to a user. In some example, the transient user interface is presented to the user via a visual display generated by a display device. The display may include a projected image, an image on a screen, a holographic image, or any other type of display.

In other examples, the transient user interface control is presented to the user via audio output, such as text-to-speech emulator, or other audio output to present data in a natural language format.

In some examples, the transient user interface control 700 is always displayed to the user. In other examples, the transient user interface control is only displayed some of the time.

The transient user interface control may be displayed in its entirety, completely hidden from view, collapsed, or otherwise not presented to the user for a given period of time. In these examples, a user selects to view or receive the transient user interface control by selecting an icon, making a verbal command, making a physical gesture or movement, pushing a physical control, or otherwise performing an action to initiate display of the transient user interface control 700.

The contextual breadcrumb list 702 is displayed within the transient user interface control. In some examples, the entire contextual breadcrumb list 702 is displayed. In other examples, the contextual breadcrumb list 702 is only partially displayed. The contextual breadcrumb list 702 may be partially hidden or only partially visible within the display. In such cases, one or more nodes of the contextual breadcrumb list are not visible to the user. A partially visible contextual breadcrumb list only provides a view of a portion of the nodes.

In one example, a partially visible contextual breadcrumb list includes only the first three nodes within a same level. In another example, a partially visible contextual breadcrumb list provides a visual view of only the middle ten nodes within the same level of the hierarchy. The nodes at the beginning and end of the breadcrumb list are collapsed or otherwise not visible to the user.

In other examples, the contextual breadcrumb list is completely obscured, completely collapsed, or otherwise not visible to the user. In such examples, the user can select a control or perform an action to open the contextual breadcrumb list for display of the contextual breadcrumb list in its entirety or display a portion of the contextual breadcrumb list. The contextual breadcrumb list in these examples may be represented by a visible icon or a non-visual indicator, such as an audible sound.

The user may select an icon, speak a verbal command, or take some other action to initiate expansion of the collapsed contextual breadcrumb list. Upon expansion, the contextual breadcrumb list is displayed in whole or in part to the user.

In other examples, the contextual breadcrumb list is presented to a user in whole or in part via an audio format. For example, a speech emulator may provide an audible description of items or read items or text in the contextual breadcrumb list to the user via a text-to-speech emulator or other speech synthesizer for providing data to the user in an audible format. The contextual breadcrumb list may be presented in whole or in part via audio output.

In one example, a user makes verbal requests for information regarding the user's current location within the hierarchical list of items, current item within the hierarchy, or other items/levels in the breadcrumb list. The transient user interface control outputs the breadcrumb list to the user in natural language.

The set of control 714 are user interface controls for performing actions on the contextual breadcrumb list and/or a portion of the items in the hierarchical set of items being viewed by the user. The set of controls 714 in this non-limiting examples includes a transient scroll 708 control for scrolling through the nodes representing each parent node in the path from the root node to the set of current items 706 at the current level 704. A user scrolls up or down through the contextual breadcrumb list or a transient scroll path using the transient scroll 708.

The scoped sort 710 is a control for performing a sort on the set of current items 706. The user utilizes the scoped sort 710 control to initiate a sort of items within the context of the current level based on one or more sort criteria.

The scoped search 712 control initiates a search on the set of current items 706 in the current level 704 using one or more search criteria. The search is performed only on the items in the current level in some examples. In other examples, the scoped search is performed on items at the current level and items nested within the set of current items 706.

The scoped filter 714 is a control for user selection of the scoped filter action. The scoped filter control initiates a filter of a set of items at the current level in accordance with one or more user selected filter criteria.

Figure 8:
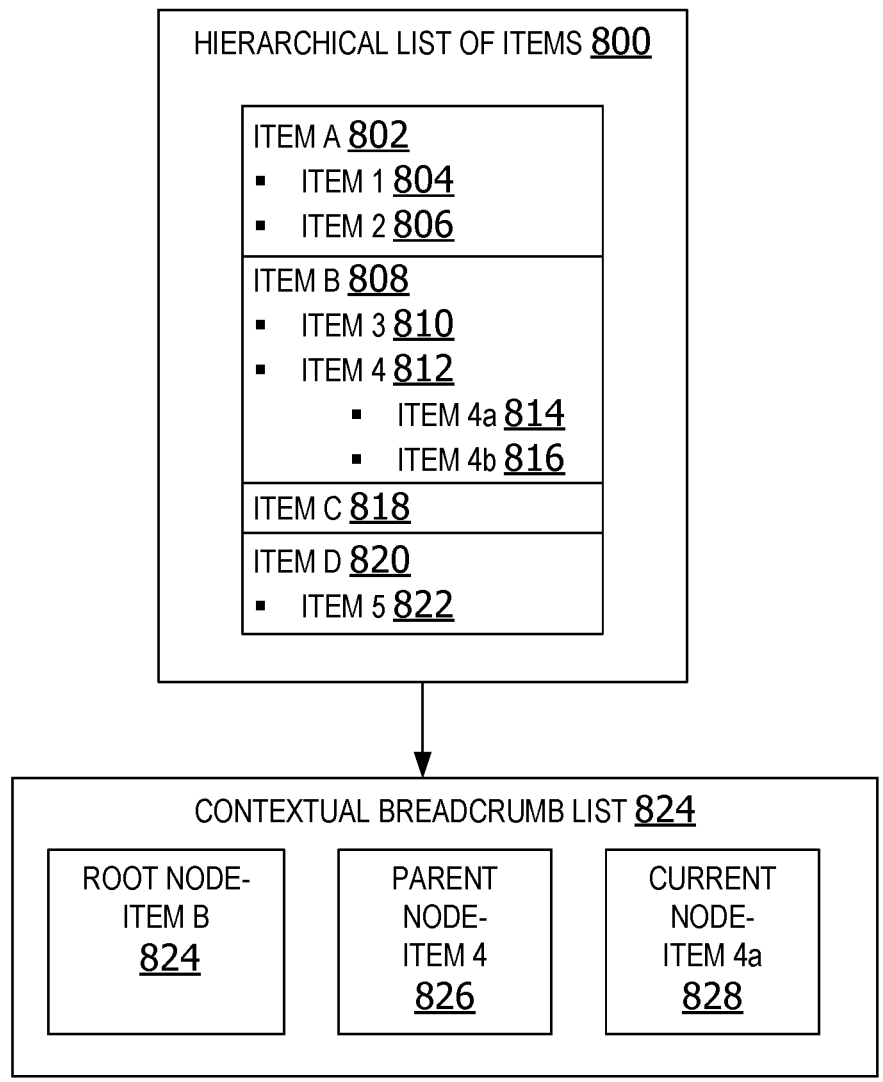
FIG. 8 is an exemplary block diagram of a contextual breadcrumb list.

FIG. 8 is an exemplary block diagram of a contextual breadcrumb list. The hierarchical list of items 800 in this example includes item A 802, item B 808, item C 818, and item D 820 at a first level. The item A 802 includes nested items 804 and 806 at a second level. Item B 808 includes nested items 810 and 812 at a second level. Item C 818 includes no nested items. Item D 820 includes a single nested item 822.

In this example, nested item 812 includes nested items 814 and 816 at the third level. If a user scrolls through a portion of the hierarchical list following a path from item B 808 to item 812 and then to item 814, the navigation engine automatically generates a contextual breadcrumb list 824 representing that temporary path through which the user currently scrolled. The contextual breadcrumb list 824 includes a parent node 824 representing item 808 at the first level, a parent node 826 representing the parent item 812 at the second level, and a current node 828 representing the current set of items being viewed at the third level, item 816.

In this example, items 802, 808, 818, and 820 are siblings on the same level. Likewise, items 810 and 812 are siblings on the same level within the hierarchy. Items 814 and 816 are also siblings on the same level.

In this example, if the user navigates through a different portion of the hierarchical list of items 800 to view a new set of current items, the contextual breadcrumb list automatically updates to include a new set of nodes representing the path from a root node to the new set of current items.

In this example, the user flexibly and quickly navigates the hierarchical tree of items by going up the hierarchy or between siblings in the same hierarchy via a different interaction with the breadcrumb list. For example, a user selects a node in the contextual breadcrumb list 824 to navigate directly to the level within the hierarchy represented by the selected node. The selection of one or more nodes in the contextual breadcrumb list changes the items being displayed within the hierarchical list of items. For example, if a user selects root node 824 in the contextual breadcrumb list, the hierarchical list of items being displayed to the user will automatically change from the portion of the list of items at the current item 816 back to the portion of the hierarchical list of items at the first level containing item B 808. If the user selects parent node 826 in the transient user interface control, the display changes to present the portion of the list of items at the second level associated with item 812. In this manner, the user utilizes the contextual breadcrumb list to navigate through the hierarchical list of items 800 with improved ease and efficiency.

Figure 9:
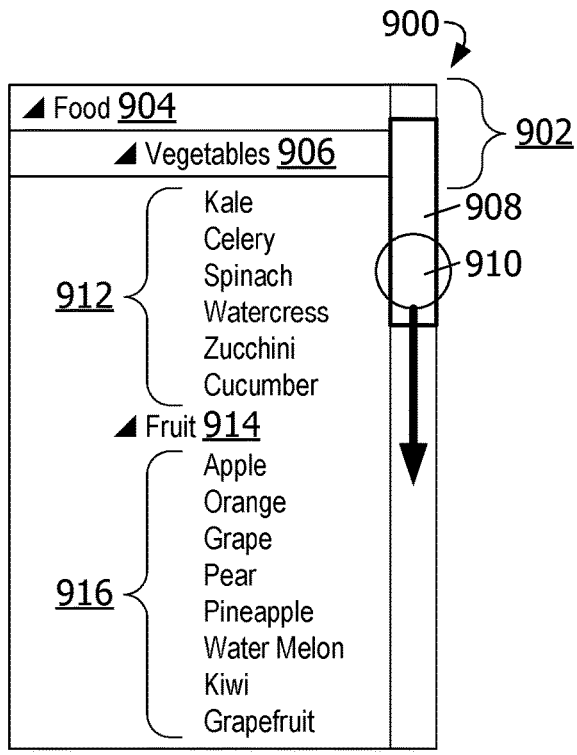
FIG. 9 is an exemplary block diagram of a transient user interface control presented in response to a user scrolling down.

FIG. 9 is an exemplary block diagram of a transient user interface control presented in response to a user scroll down. The display 900 in this example includes a portion of a hierarchical list of items beginning with an entry for "kale" and ending with an entry for "Grapefruit". The remaining portions of the hierarchical list of items are not viewable until the user scrolls up or scrolls down to change the items currently being displayed.

The transient user interface control 902 includes a node 904 for the parent node "food" and a current node 906 for the item "vegetables". The item fruit is a sibling on the same level as the item vegetables. As the user scrolls down 910 using the scroll bar 908, the currently viewed items change and the transient user interface control automatically updates to display a contextual breadcrumb list for the current items being viewed. The item vegetable includes nested items 912.

As the user scrolls down past the vegetables to display nested items 916 contained within the item 914 "fruit", the breadcrumb list is automatically updated to replace the current node vegetables 906 with a new current node fruit 914. The update occurs without the user selecting vegetables, fruit, or any other item being displayed within the hierarchical tree of items.

In this example, the transient user interface control is provided above the hierarchical list of items. However, in other examples, the transient user interface control is provided at the bottom of the display, along the side of the display, within a split-screen area, or in any other portion of the display.

Figure 10:
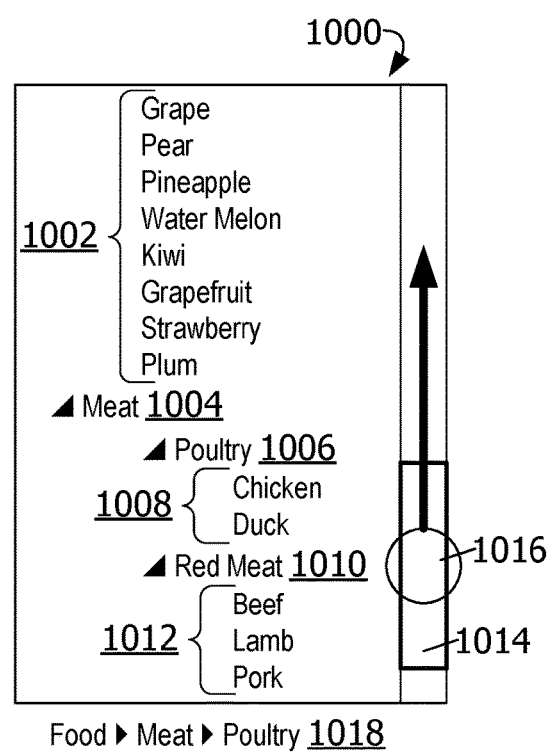
FIG. 10 is an exemplary block diagram of a transient user interface control presented in response to a user scrolling up.

FIG. 10 is an exemplary block diagram of a transient user interface control presented in response to a user scroll up. In this example, the display 1000 includes nested item 1002 which are not being scrolled through. The items 1002 which are not being scrolled through are excluded from the contextual breadcrumb list 1018.

The currently viewed item poultry 1006 nested within the item meat 1004 is included within the contextual breadcrumb list 1018. In this example, the user was viewing items 1012 nested within the item red meat 1010 prior to scrolling up 1016 using scroll bar 1014. As the user scrolls up from red meat 1010 to poultry 1006, the contextual breadcrumb list 1018 automatically updates to include nodes representing items within the current level of items that is being viewed.

In this non-limiting example, the contextual breadcrumb list 1018 is included in a transient user interface control at the bottom of the display in an area below the hierarchical list of items. In other examples, the contextual breadcrumb list 1018 may be displayed above the list, to the side, or any other portion of the display.

Figure 11:
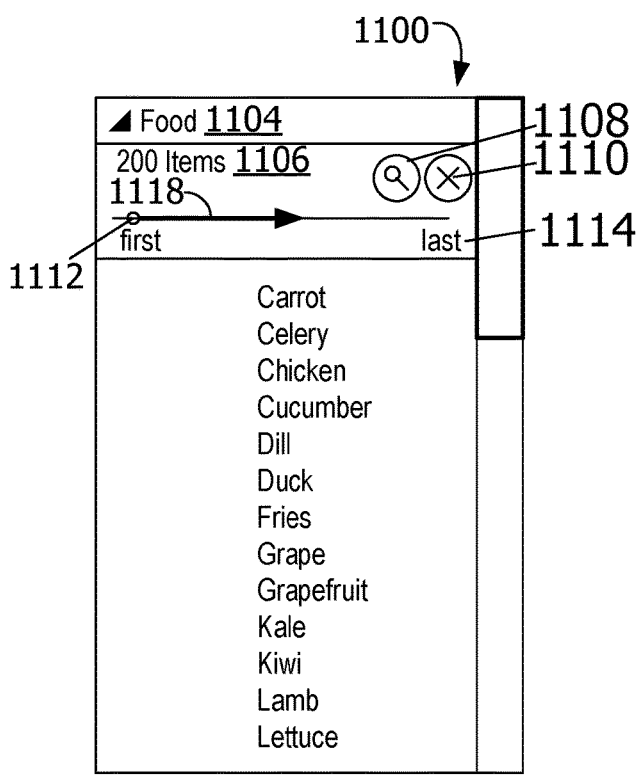
FIG. 11 is an exemplary block diagram of a scoped search icon and scoped sort icon associated with a transient user interface control.

FIG. 11 is an exemplary block diagram of a scoped search icon and scoped sort icon associated with a transient user interface control. The display 1100 in this example includes a transient user interface control providing a root node 1104 representing the current level being viewed by the user. The transient user interface control includes a number of items in the current level 1106, a scoped search control 1108, a scoped sort control 1110, a transient scroll bar 1118 enabling a user to scroll through the contextual breadcrumb list from the first entry 1112 to the last entry 1114 nested within the item food 1104 without utilizing the scroll bar.

In this example, the list of items is sorted alphabetically using the sort control. The user quickly navigates the sorted list via a control, such as control 1112, 1114, and 1118.

Figure 12:
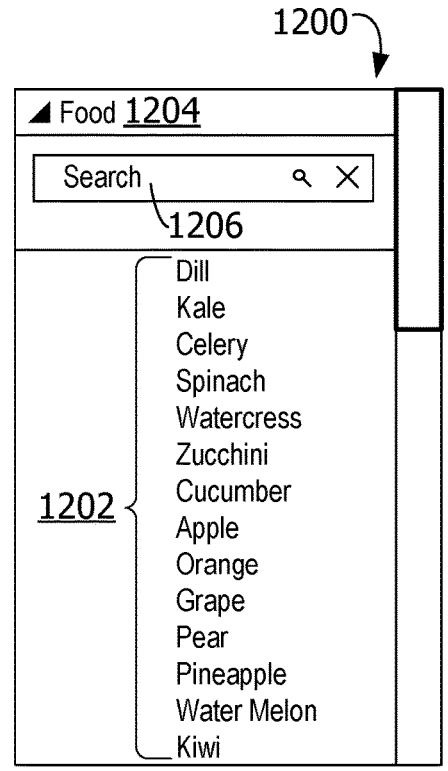
FIG. 12 is an exemplary block diagram of a scoped search bar associated with a transient user interface control.

FIG. 12 is an exemplary block diagram of a scoped search bar associated with a transient user interface control. The display 1200 in this non-limiting example includes a portion of a hierarchical list of items 1202 being viewed. The contextual breadcrumb list 1204 includes a root node representing the current level of the items 1202 being viewed.

The scoped search 1206 bar is a control for entering one or more search terms. When a user enters a search term, the search is conducted within the food 1204 item. In other words, only items nested within food 1204 are searched using the entered search criteria. If a user enters the search criteria "cucumber", the items nested within food 1204 will be searched. In this example, an item "cucumber" would be returned by the search.

Selecting the result jumps the display to the first match. The result may be selected by clicking, touching, gesturing, pinching, zooming, gazing, speaking, or any other selection means. Gazing refers to utilizing a user's gaze, eye movements, eye line, or other indications of a direction in which a user is looking to determine which item or result a user is selecting.

In some examples, a user selects a result by speaking or making a sound that is recognized by a speech recognition system. In still other examples, a user selects a result by touching a touch screen. In still other examples, a user selects a result by gazing or looking at a result. In this example, a camera or other sensor device tracks eye movement, head movements, body movements, or other sensors for tracking an eye line or identifying a direction in which a user's eye is focused. If there are multiple matches, a control enables the user to move between the different search results. Selecting each search result moves the display to the search result item in the hierarchical list of items.

Figure 13:
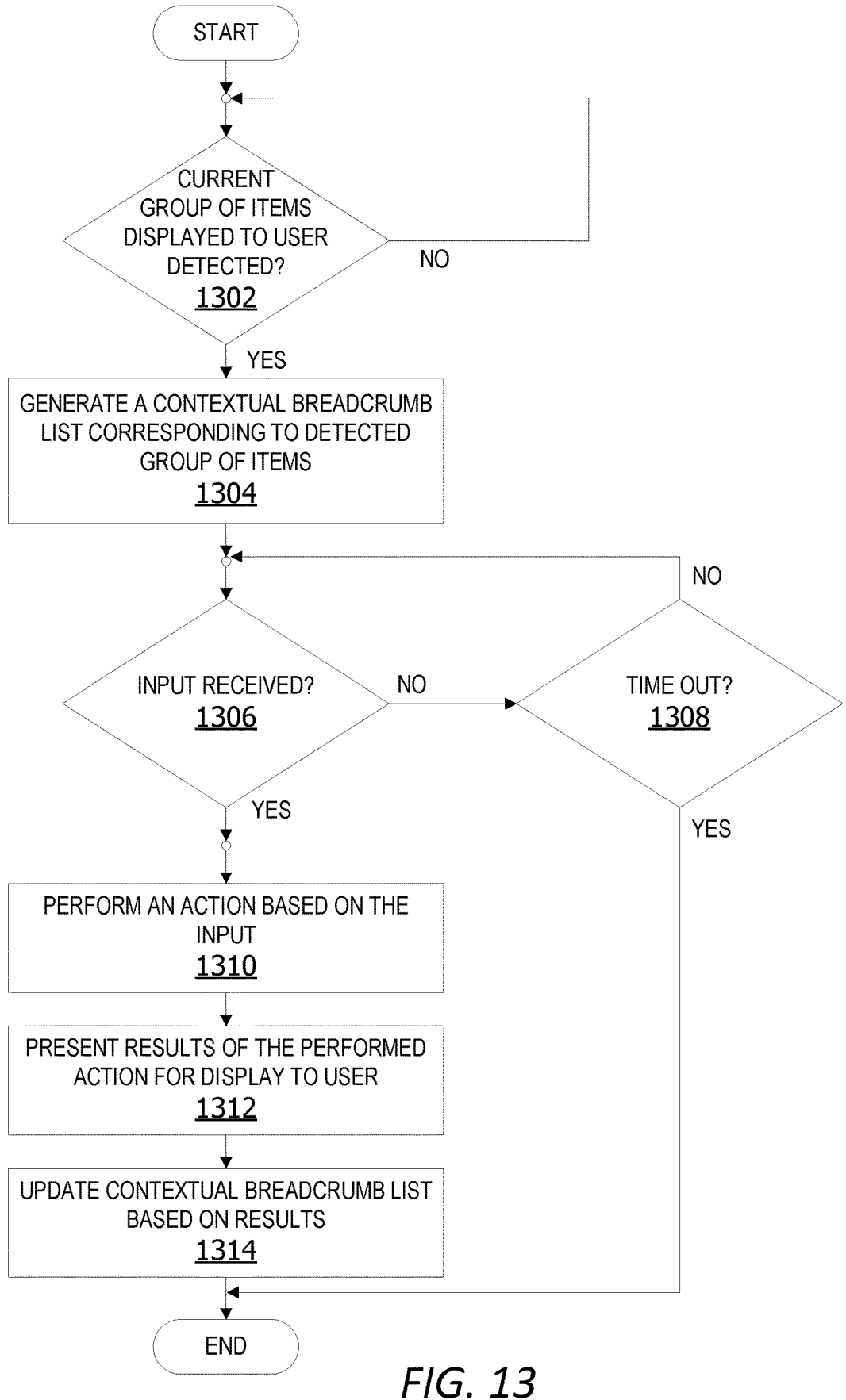
FIG. 13 is an exemplary flow chart illustrating operation of a navigation engine to perform an action associated with a transient user interface control.

FIG. 13 is an exemplary flow chart illustrating operation of a navigation engine to perform an action associated with a transient user interface control. The process shown in FIG. 13 may be performed by a navigation engine running on a computing device, such as, but not limited to, navigation engine 118 in FIG. 1, navigation engine 216 in FIG. 2 or navigation engine 600 in FIG. 6. Further, execution of the operations illustrated in FIG. 13 is not limited to a computing device. One or more computer-readable storage media storing computer-readable instructions may execute to cause at least one processor to implement the operations illustrated in FIG. 13.

A determination is made as to whether a current group of items displayed to a user is detected at 1302. If yes, a contextual breadcrumb list corresponding to the detected group of items is generated at 1304. A determination is made as to whether input is received from a user at 1306. If no, a determination is made as to whether a time out has occurred at 1308. If the time out has occurred, the process terminates thereafter.

If input is received at 1306, an action is performed based on the input at 1310. The results of the performed action are presented for display to the user at 1312. The contextual breadcrumb list is updated based on the results at 1314. The process terminates thereafter.

While the operations illustrated in FIG. 13 are described as being performed by a host computing device or a server, aspects of the disclosure contemplate that performance of the operations by other entities. For example, a cloud service may perform one or more of the operations.

Figure 14:
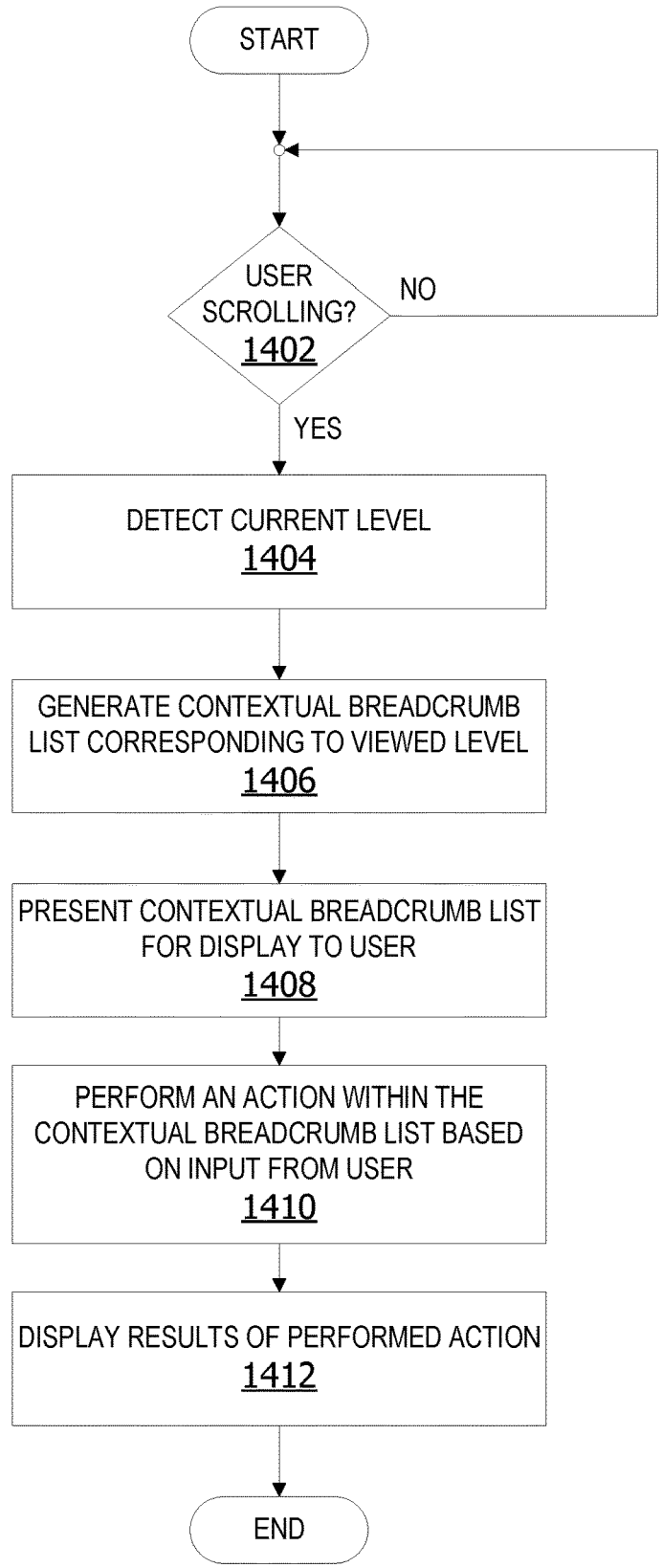
FIG. 14 is an exemplary flow chart illustrating operation of a navigation engine to generate a contextual breadcrumb list.

FIG. 14 is an exemplary flow chart illustrating operation of a navigation engine to generate a contextual breadcrumb list. The process shown in FIG. 14 may be performed by a navigation engine running on a computing device, such as, but not limited to, navigation engine 118 in FIG. 1, navigation engine 216 in FIG. 2 or navigation engine 600 in FIG. 6. Further, execution of the operations illustrated in FIG. 14 is not limited to a computing device. One or more computer-readable storage media storing computer-readable instructions may execute to cause at least one processor to implement the operations illustrated in FIG. 14.

While the operations illustrated in FIG. 14 are described as being performed by a host computing device or a server, aspects of the disclosure contemplate that performance of the operations by other entities. For example, a cloud service may perform one or more of the operations.

A determination is made as to whether a user is scrolling through a list of items at 1402. If yes, a current level is detected at 1404. A contextual breadcrumb list corresponding to the viewed level is generated at 1406. The contextual breadcrumb list is presented for display to the user at 1408. An action is performed within the contextual breadcrumb list based on input from the user at 1410. The results of the performed action are displayed to the user at 1412. The process terminates thereafter.

Figure 15:
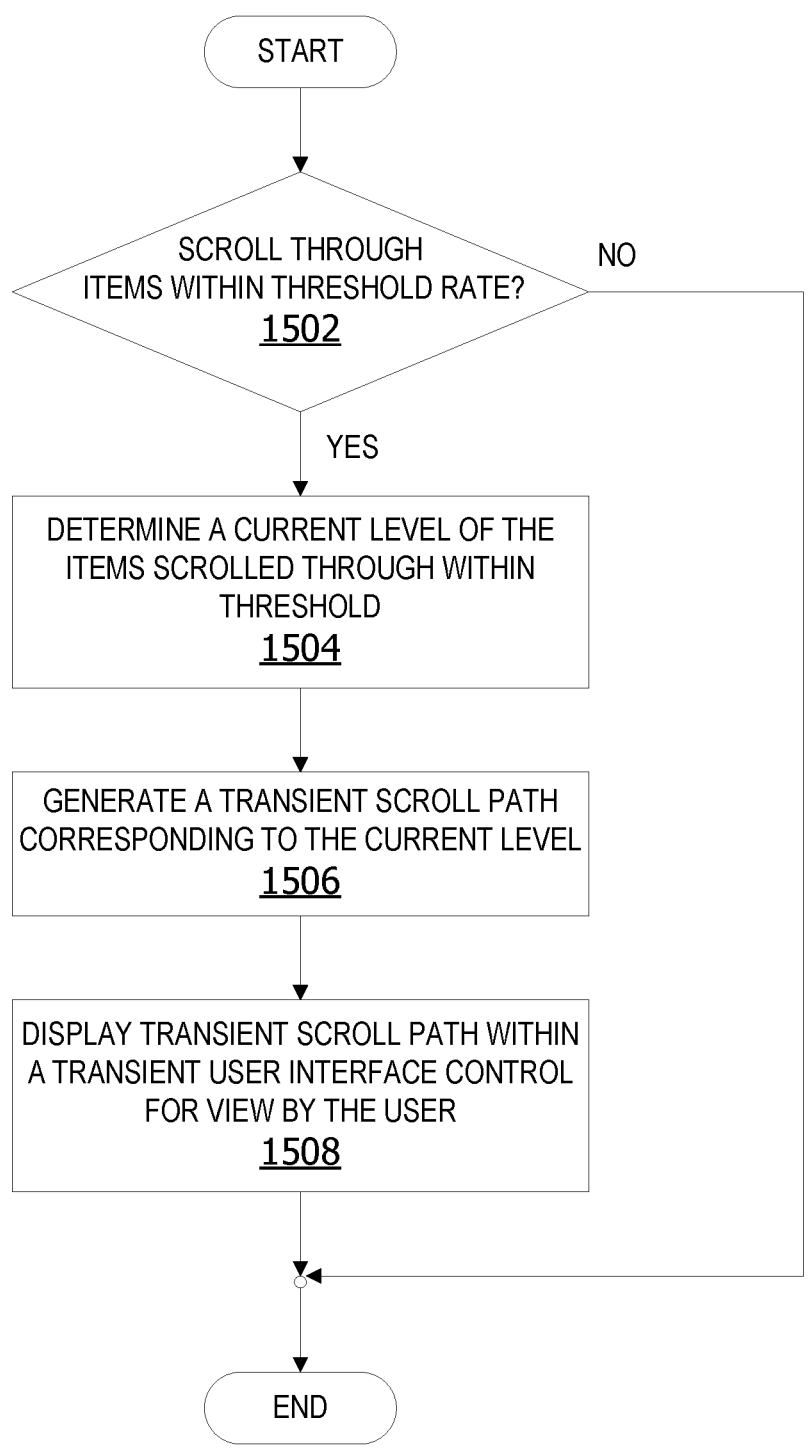
FIG. 15 is an exemplary flow chart illustrating operation of a navigation engine to generate a transient scroll path based on a user scrolling through a hierarchical set of items.

FIG. 15 is an exemplary flow chart illustrating operation of a navigation engine to generate a transient scroll path based on a user scrolling through a hierarchical set of items. The process shown in FIG. 15 may be performed by a navigation engine running on a computing device, such as, but not limited to, navigation engine 118 in FIG. 1, navigation engine 216 in FIG. 2 or navigation engine 600 in FIG. 6. Further, execution of the operations illustrated in FIG. 15 is not limited to a conventional computing device (e.g., execution may be performed by a dedicated circuit or another execution modality). One or more computer-readable storage media storing computer-readable instructions may execute to cause at least one processor to implement the operations illustrated in FIG. 15.

A determination is made as to whether a user scrolls through a one or more items within (e.g., less than or equal to) a threshold scroll rate at 1502. The threshold scroll rate may include a rate of scrolling or a scroll pause time for viewing items. If no, the process terminates thereafter. If yes, a current level of the items being viewed within the threshold scroll rate is determined at 1504. A transient scroll path corresponding to the current level is generated at 1506.

While the operations illustrated in FIG. 15 are described as being performed by a host computing device or a server, aspects of the disclosure contemplate that performance of the operations by other entities. For example, a cloud service may perform one or more of the operations.

Figure 16:
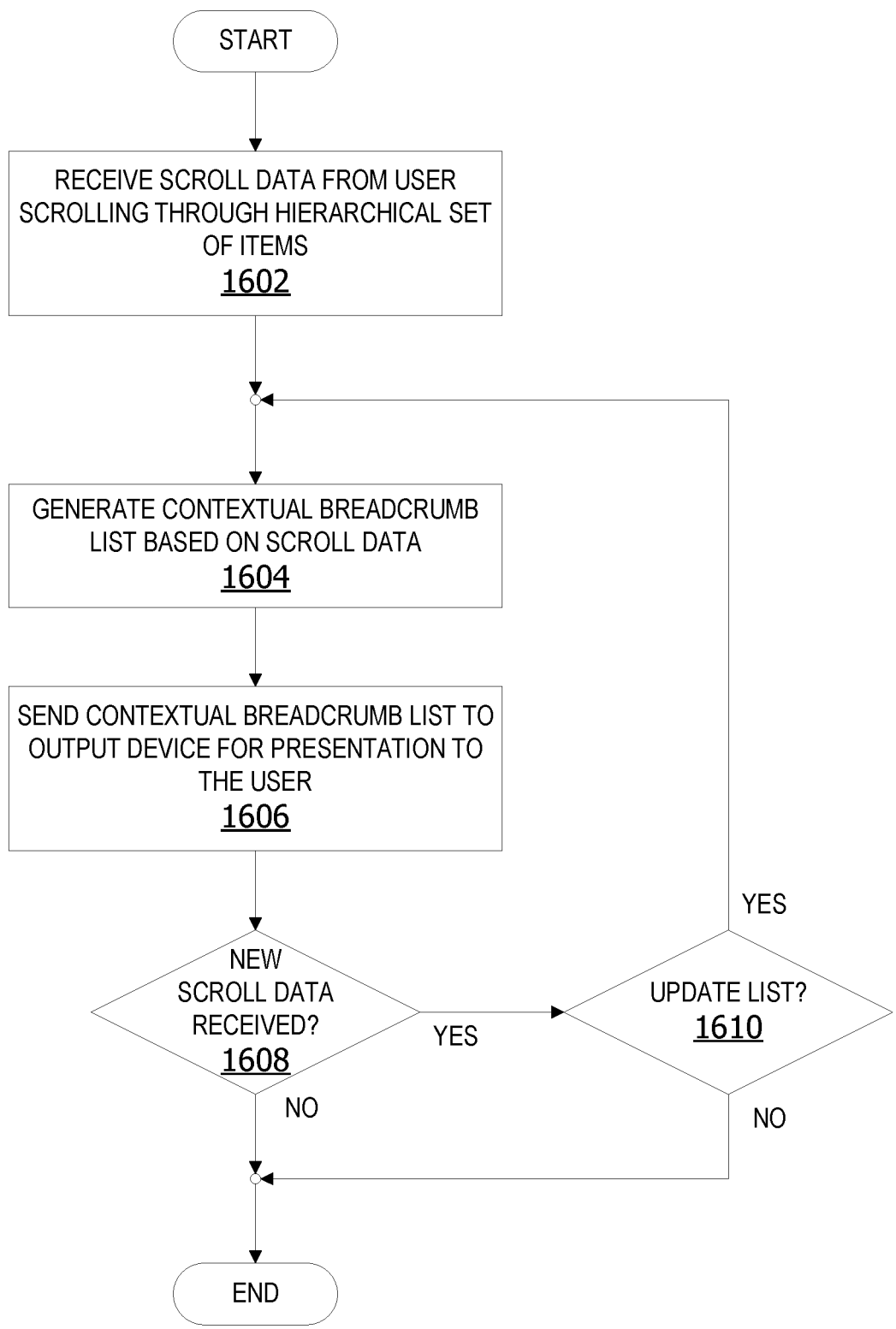
FIG. 16 is an exemplary flow chart illustrating operation of a navigation engine to update a contextual breadcrumb list.

FIG. 16 is an exemplary flow chart illustrating operation of a navigation engine to update a contextual breadcrumb list. The process shown in FIG. 16 may be performed by a navigation engine running on a computing device, such as, but not limited to, navigation engine 118 in FIG. 1, navigation engine 216 in FIG. 2 or navigation engine 600 in FIG. 6. Further, execution of the operations illustrated in FIG. 16 is not limited to a computing device. One or more computer-readable storage media storing computer-readable instructions may execute to cause at least one processor to implement the operations illustrated in FIG. 16.

Scroll data is received from a user scrolling through a hierarchical set of items at 1602. A contextual breadcrumb list is generated based on the scroll data at 1604. The contextual breadcrumb list is sent to an output device for presentation to the user at 1606. A determination is made as to whether new scroll data is received at 1608. If yes, a determination is made as to whether to update the contextual breadcrumb list at 1610. If no, the process terminates thereafter.

If the breadcrumb list is updated, the process returns to 1604 to generate an updated contextual breadcrumb list based on the new scroll data. The new contextual breadcrumb list is sent to the output device for presentation to the user at 1606. The determination is made as to whether new scroll data is received. If no, the process terminates thereafter.

In this example, the scroll data is utilized to create a contextual breadcrumb list. In other examples, the scroll data is utilized to create a transient scroll path.

While the operations illustrated in FIG. 16 are described as being performed by a host computing device or a server, aspects of the disclosure contemplate that performance of the operations by other entities. For example, a cloud service may perform one or more of the operations.

Figure 17:
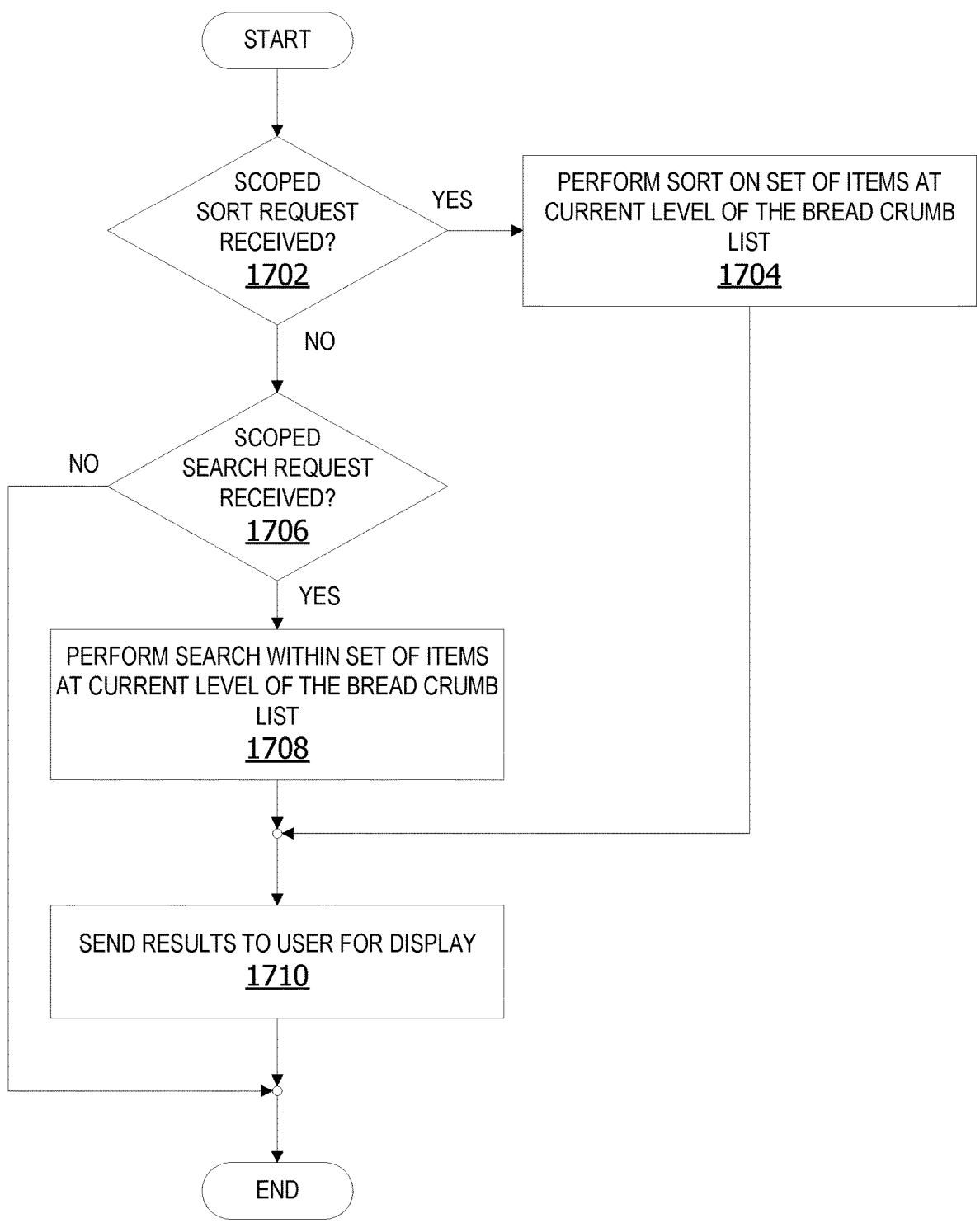
FIG. 17 is an exemplary flow chart illustrating operation of a navigation engine to perform a scoped search and scoped sort within a current level of a contextual breadcrumb list.

FIG. 17 is an exemplary flow chart illustrating operation of a navigation engine to perform a scoped search and scoped sort within a current level of a contextual breadcrumb list. The process shown in FIG. 17 may be performed by a navigation engine running on a computing device, such as, but not limited to, navigation engine 118 in FIG. 1, navigation engine 216 in FIG. 2 or navigation engine 600 in FIG. 6. Further, execution of the operations illustrated in FIG. 17 is not limited to a computing device. One or more computer-readable storage media storing computer-readable instructions may execute to cause at least one processor to implement the operations illustrated in FIG. 17.

A determination is made as to whether a scoped sort request is received at 1702. If yes, the sort is performed on the set of items at a current level of the contextual breadcrumb list at 1704. A determination is made as to whether a scoped search request is received at 1706. If yes, a search is performed within the set of items at the current level of the breadcrumb list at 1708. The results are sent to the user for display at 1710. The process terminates thereafter.

While the operations illustrated in FIG. 17 are described as being performed by a computing device or a server, aspects of the disclosure contemplate that performance of the operations by other entities. For example, a cloud service may perform one or more of the operations.

Additional Examples

In some examples, a system is provided that includes a memory storing data corresponding to a hierarchical set of items and one or more processors programmed to automatically detect a current level in the hierarchical set of items in response to a user scrolling through the hierarchical set of items, the current level comprising at least one group of items; generate a contextual breadcrumb list representing a path from at least one parent node in the hierarchical set of items to the detected current level; present the contextual breadcrumb list and a transient user interface control for display to the user via at least one display device, a scope of the transient user interface control being adjusted based on the detected current level; perform an action on the at least one group of items within the detected current level based on input received from the user via the presented transient user interface control; and present, for display, results of the performed action.

In another example scenario, one or more computer storage media embodying computer-executable components is provided. The components include a navigation engine component that when executed, causes at least one processor to automatically detect a current level in a hierarchical set of items in response to a change in a context associated with at least one portion of the hierarchical set of items viewed by a user and generate a contextual breadcrumb list representing a path from a root node in the hierarchical set of items to the detected current level; a transient user interface control component, that when executed, causes the at least one processor to display the contextual breadcrumb list and a set of controls to the user; and a transient filter component, that when executed, causes the at least one processor to perform an action including a search or sort of at least one group of items within the detected current level based on input received from the set of controls associated with the transient user interface control and present results of the performed action for display to the user.

Alternatively, or in addition to the other examples described herein, examples include any combination of the following:
  perform a scoped sort action on at least one group of items at the current level in response to the user selecting at least one sort criteria;
  perform a scoped filter action on at least one group of items at the current level in response to the user selecting at least one filter criteria;
  perform a scoped search action on at least one group of items at the current level in response to the user selecting at least one search criteria;
  automatically detect the current level without the user clicking through the hierarchical set of items;
  automatically detect the current level without the user selecting an item in the current level through the hierarchical set of items;
  automatically detect a new current level in the hierarchical set of items in response to the user scrolling through the hierarchical set of items to the new current level;
  update a transient scroll path representing a path from at least one parent node in the hierarchical set of items to the new current level
  display an updated transient scroll path and the transient user interface control via a display device;
  generate the contextual breadcrumb list at a first computing device based on the input received from a second computing device via a network;
  receive the input indicating the user selection of a sort control associated with the transient user interface control
  sort items within the detected current group of items based on at least one sort criteria, wherein items within the current group of items are sorted, and wherein items within the plurality of groups of items that are excluded from the current group of items remain unsorted;
  sort the items within the current group of items alphabetically;
  apply a threshold scroll pause time or a threshold scroll rate
  receive the input indicating the user selection of a search control associated with the transient user interface control;

perform a search on the detected current group of items based on at least one search criteria, wherein items within the plurality of groups of items that are excluded from the current group of items are excluded from the search;

automatically detect a change in a context of the plurality of groups of items, wherein the change in context comprises a zoom-in or zoom-out action associated with at least one item in the current group of items;

generate a contextual breadcrumb list representing a path from a root node in the hierarchical set of items to the current group of items;

display the contextual breadcrumb list and the transient user interface control to the user via the display device;

automatically detect a current level in the hierarchical set of items in response to a user scrolling through a portion of the hierarchical set of items at a threshold scroll rate, the current level comprising the current group of items;

generate a transient scroll path representing a path from a root node in the hierarchical set of items to the current group of items traversed by the user via the scrolling through the portion of the hierarchical set of items within (e.g., less than or equal to) the threshold scroll rate;

display the transient scroll path within the transient user interface control;

automatically detect a new current level in the hierarchical set of items in response to the user scrolling through a different portion of the hierarchical set of items within the threshold scroll rate to the new current level;

update the transient scroll path, wherein the updated transient scroll path represents a path from at least one parent node in the hierarchical set of items to the new current level;

display the updated transient scroll path and the transient user interface control via the display device, wherein the updated transient scroll path represents a path from a root node to the new current level;

wherein the change in the context is a zoom-in or zoom-out action performed on at least one item in the current level of the hierarchical set of items;

automatically detect a scroll up or a scroll down through at least the portion of the hierarchical set of items and automatically detect the current level in the hierarchical set of items as the user scrolls through the at least a portion of the hierarchical set of items;

receive input from a transient user interface control associated with a second computing device via a network; perform an action including the search or the sort on the generated contextual breadcrumb list based on the input; and send results of the performed action to the transient user interface control associated with the second computing device via the network;

receive navigation aids, including the contextual breadcrumb list, from a navigation engine associated with a second computing device via a network; and display the navigation aids to the user via a display device, the navigation aids corresponding to the hierarchical set of items.

At least a portion of the functionality of the various elements in FIG. 1, FIG. 2, FIG. 3, FIG. 6, and FIG. 7 may be performed by other elements in FIG. 1, FIG. 2, FIG. 3, FIG. 6, and FIG. 7, or an entity (e.g., processor, web service, server, application program, computing device, etc.) not shown in FIG. 1, FIG. 2, FIG. 3, FIG. 6, and FIG. 7.

In some examples, the operations illustrated in FIG. 13, FIG. 14, FIG. 15, FIG. 16, and FIG. 17 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for providing navigation aids. For example, the elements illustrated in FIG. 1, FIG. 2, FIG. 3, FIG. 6, and FIG. 7, such as when encoded to perform the operations illustrated in FIG. 13, FIG. 14, FIG. 15, FIG. 16, and FIG. 17, constitute exemplary means for automatically detecting a current level in the hierarchical set of items in response to a user scrolling through the hierarchical set of items, exemplary means for generating a contextual breadcrumb list representing a path from at least one parent node in the hierarchical set of items to the detected current level, exemplary means for presenting the contextual breadcrumb list and a transient user interface control for display to the user via at least one display device, a scope of the transient user interface control being adjusted based on the detected current level; exemplary means for performing an action on the at least one group of items within the detected current level based on input received from the user via the presented transient user interface control; and, exemplary means for presenting results of the performed action for display.

In another example, the elements illustrated in FIG. 1, FIG. 2, FIG. 3, FIG. 6, and FIG. 7, such as when encoded to perform the operations illustrated in FIG. 13, FIG. 14, FIG. 15, FIG. 16, and FIG. 17, constitute exemplary means for automatically detecting a current group of items among a plurality of groups of items viewed by a user; exemplary means for presenting a transient user interface control directed to the detected current group of items for display by a display device; exemplary means for performing an action including a search or sort of the detected current group of items based on input received from the user via the presented transient user interface control; and exemplary means for presenting a result of the performed action for display.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a memory that stores data corresponding to a hierarchical set of items; and
one or more processors programmed to:
detect a current level in the hierarchical set of items based on a user scrolling through the hierarchical set of items less than or equal to a threshold scroll rate, wherein a scroll rate is a rate or speed with which the user scrolls through a portion of the hierarchical set of items, the current level comprising at least one group of items;
generate a contextual breadcrumb list representing a path from at least one parent node in the hierarchical set of items to the detected current level; and
present the contextual breadcrumb list via at least one display device.

2. The system of claim 1, wherein the processor is further programmed to present a transient user interface control for display to the user via at least one display device, a scope of the transient user interface control being adjusted based on the detected current level.

3. The system of claim 1, wherein the current level comprises at least one group of items, and wherein the processor is further programmed to perform an action on the at least one group of items within the detected current level based on input received from the user via the presented transient user interface control.

4. The system of claim 3, wherein the action is a scoped sort action, wherein the one or more processors are programmed to perform the scoped sort action on the at least one group of items in response to the user selecting at least one sort criteria.

5. The system of claim 3, wherein the action is a scoped filter action, wherein the one or more processors are programmed to perform the scoped filter action on the at least one group of items in response to the user selecting at least one filter criteria.

6. The system of claim 3, wherein the action is a scoped search action performed on the at least one group of items, wherein the one or more processors are programmed to perform a search within the at least one group of items in response to the user selecting at least one search criteria.

7. The system of claim 1, wherein the at least one parent node is a graphic representing both an item and a given level of the item within the hierarchy set of items.

8. A method for intelligent navigation of a hierarchical set of items, the method comprising:
  detecting a current level in the hierarchical set of items based on a user scrolling through the hierarchical set of items less than or equal to a threshold scroll rate, wherein a scroll rate is based on how many items the user scrolls through within a given unit of time, the current level comprising at least one group of items;
  generating a contextual breadcrumb list representing a path from at least one parent node in the hierarchical set of items to the detected current level; and
  presenting the contextual breadcrumb list via at least one display device.

9. The method of claim 8, further comprising presenting a transient user interface control for display to the user via at least one display device, a scope of the transient user interface control being adjusted based on the detected current level.

10. The method of claim 8, wherein the current level comprises at least one group of items, and wherein the method further comprises performing an action on the at least one group of items within the detected current level based on input received from the user via the presented transient user interface control.

11. The method of claim 10, wherein the action is a transient sort and further comprising:
  receiving the input indicating the user selection of a sort control associated with the transient user interface control; and
  sorting items within the detected current group of items based on at least one sort criteria, wherein items within the current group of items are sorted, and wherein items within the plurality of groups of items that are excluded from the current group of items remain unsorted.

12. The method of claim 10, wherein the action is a transient filter and further comprising:
  receiving the input indicating the user selection of a filter control associated with the transient user interface control; and
  filtering the detected current group of items based on at least one criteria, wherein items within the plurality of groups of items that are excluded from the current group of items are excluded from the filtering.

13. The method of claim 10, wherein the action is a transient search and further comprising:
  receiving the input indicating the user selection of a search control associated with the transient user interface control; and
  performing a search on the detected current group of items based on at least one search criteria, wherein items within the plurality of groups of items that are excluded from the current group of items are excluded from the search.

14. One or more computer storage media comprising computer-executable instructions that, when executed by one or more processors, cause the one or more processors to perform the following operations:
  detect a current level in a hierarchical set of items based on a user scrolling through the hierarchical set of items less than or equal to a threshold scroll rate, wherein a scroll rate is a rate or speed with which the user scrolls through a portion of the hierarchical set of items, the current level comprising at least one group of items;
  generate a contextual breadcrumb list representing a path from at least one parent node in the hierarchical set of items to the detected current level; and
  present the contextual breadcrumb list via at least one display device.

15. The computer storage media of claim 14, wherein the computer-executable instructions further cause the one or more processors to present a transient user interface control for display to the user via at least one display device, a scope of the transient user interface control being adjusted based on the detected current level.

16. The computer storage media of claim 15, wherein the current level comprises at least one group of items, wherein the computer-executable instructions further cause the one or more processors to perform an action on the at least one group of items within the detected current level based on input received from the user via the presented transient user interface control.

17. The computer storage media of claim 15, wherein the action is a scoped sort action, wherein the computer-executable instructions further cause the one or more processors to perform the scoped sort action on the at least one group of items in response to the user selecting at least one sort criteria.

18. The computer storage media of claim 15, wherein the action is a scoped filter action, wherein the computer-executable instructions further cause the one or more processors to perform the scoped filter action on the at least one group of items in response to the user selecting at least one filter criteria.

19. The computer storage media of claim 15, wherein the action is a scoped search action performed on the at least one group of items, wherein the computer-executable instructions further cause the one or more processors to perform a search within the at least one group of items in response to the user selecting at least one search criteria.

20. The computer storage media of claim 14, wherein the at least on parent node is a graphic representing both an item and a given level of the item within the hierarchy set of items.

* * * * *